United States Patent
Song

(10) Patent No.: US 8,684,881 B2
(45) Date of Patent: Apr. 1, 2014

(54) TRANSMISSION GEAR BOX FOR BIKES

(76) Inventor: Yun Yi Song, Osan-si (KR)

( * ) Notice: Subject to any disclaimer, the term of this patent is extended or adjusted under 35 U.S.C. 154(b) by 0 days.

(21) Appl. No.: 13/637,615

(22) PCT Filed: Mar. 24, 2011

(86) PCT No.: PCT/KR2011/002034
§ 371 (c)(1),
(2), (4) Date: Sep. 26, 2012

(87) PCT Pub. No.: WO2011/122787
PCT Pub. Date: Oct. 6, 2011

(65) Prior Publication Data
US 2013/0017922 A1 Jan. 17, 2013

(30) Foreign Application Priority Data

Mar. 29, 2010 (KR) .......................... 10-2010-0027906
Apr. 2, 2010 (KR) .......................... 10-2010-0030276

(51) Int. Cl.
*F16H 3/44* (2006.01)
(52) U.S. Cl.
USPC ....................................................... 475/290
(58) Field of Classification Search
USPC ......... 475/290, 330, 259; 192/64; 474/70, 80, 474/78
See application file for complete search history.

(56) References Cited

U.S. PATENT DOCUMENTS

| 4,713,042 A | * | 12/1987 | Imhoff | 474/69 |
| 5,295,916 A | * | 3/1994 | Chattin | 474/78 |
| 6,158,294 A | | 12/2000 | Jung | |
| 7,988,574 B2 | * | 8/2011 | Matsumoto et al. | 474/80 |
| 8,235,859 B2 | * | 8/2012 | Yun | 475/290 |

FOREIGN PATENT DOCUMENTS

| JP | 48-064367 | 9/1973 |
| JP | 6179388 | 6/1994 |
| JP | 6263080 | 9/1994 |

* cited by examiner

*Primary Examiner* — David D Le
*Assistant Examiner* — David J Hlavka
(74) *Attorney, Agent, or Firm* — IPLA P.A.; James E. Bame

(57) ABSTRACT

Provided is a transmission gear box for bikes including: crank arms that receive a rotational driving force from rotatable pedals of each bike and transmits the received rotational driving force to a main shaft; a transmission gear unit that receives the rotational driving force from the main shaft and performs a transmission mode shifting operation at a gear tooth ratio according to a selected transmission mode gearshift; a lever manipulation unit that selects one of the transmission mode gearshifts of the transmission gear unit according to manipulation of a transmission mode shift lever, to thus manipulate one of cables connected to the respective transmission mode gearshifts; and a clutching unit that is operated by one cable selected by the lever manipulation unit to thus make one of ring gears of the transmission gear unit fixed in a gear tooth engagement coupling manner and to thereby manipulate a transmission mode shifting process of the transmission gear unit.

9 Claims, 21 Drawing Sheets

TRANSMISSION GEAR BOX FOR BIKES

BACKGROUND OF THE INVENTION

The present invention relates to a transmission gearbox for bikes, and more particularly, to a transmission gear box whose structure is improved for use in bikes, thus freely shifting transmission modes regardless of the speed of pedals and minimizing a transmission shift shock during shifting the transmission modes.

In general, in the case of existing bikes, a crankshaft distance between a pedal shaft and a pedal is fixed to be constant so that a driveability is determined and provided by only a driving force of pedals combined with the crankshaft.

The driving mechanism that is a structure of determining the driveability for such existing bikes is done within a radius of rotation with a constant rotational torque of the pedal from the pedal shaft. In particular, such a driving mechanism needs more driving energy in upward climbing roads.

In order to improve the above-described conventional defect, it is the most widely generalized to maximize driving energy by providing a transmission gear box to obtain more reasonable driving energy.

However, since the radius of rotation of the pedals that becomes a power source of the driveability is constant, the same driving energy is provided at all times. Accordingly, it is necessary to develop a transmission gear box that can maximize a driveability with a small amount of energy consumption by varying the radius of rotation of the pedals.

To this end, a speed conversion device is mounted in each bike.

An existing speed conversion device for use in bikes, however, has a sequential transmission mode shifting process. Accordingly, the existing speed conversion device for use in bikes has a disadvantage that it is difficult to run unless the transmission gear box is shifted to a low speed transmission mode in the case that each bike stops at a high speed transmission mode and then starts to run again.

In addition, the existing speed conversion device for use in bikes has a drawback that a transmission mode shift shock is caused during shifting transmission modes in a transmission gear box, in particular, the transmission shift shock becomes large during performing a high speed transmission mode shifting process.

In order to solve the above-mentioned problems of conventional art, it is an object of the present invention to provide a transmission gearbox for use in bikes in which structure of the transmission gear box is improved so that a ring gear selected in a gear tooth engagement coupling manner is fixed, to thus manipulate a transmission mode shifting process of a transmission gear unit, and to thereby immediately respond to user's desired transmission ratio regardless of speed of pedals to allow improved responsiveness.

SUMMARY OF THE INVENTION

To attain the above object of the present invention, according to an aspect of the present invention, there is provided a transmission gear box for bikes comprising:

a main shaft that is connected to pedals and crank arms of each bike;

a transmission gear unit having a plurality of transmission mode gearshifts provided in parallel and interlocked with the main shaft and receives a driving force transmitted from the main shaft to thus shift a transmission mode;

a lever manipulation unit that selects one of the transmission mode gearshifts of the transmission gear unit according to manipulation of a transmission mode shift lever, to thus manipulate one of cables connected to the respective transmission mode gearshifts; and a clutching unit that is operated by one cable selected by the lever manipulation unit to thus make one of ring gears of the transmission gear unit fixed in a gear tooth engagement coupling manner and to thereby manipulate a transmission mode shifting process of the transmission gear unit, wherein the transmission gear unit comprises:

a planet gear carrier that is spline-combined and interlocked with the main shaft;

a plurality of planet gears that are pin-coupled and interlocked with the planet gear carrier and are disposed in parallel with each other;

a plurality of the ring gears that are disposed in parallel with each other in correspondence to the planet gears, in which gear teeth are formed on inner circumferential surfaces of the ring gears so as to be respectively engaged with those of the planet gears; and sun gears and a sun gear shaft that output a transmission mode shifted driving force with respect to the driving force of the rotating main shaft to the outside when one of the ring gears is fixed by the clutching unit.

A transmission gear box for bikes according to the present invention improves structure of a transmission mechanism that is applied to a speed conversion device of each bike, to thus minimize impact on a transmission gear box that may occur during clutching transmission gears through manipulation of shifting a transmission mode and selecting a transmission mode gearshift regardless of speed of pedals.

According to the present invention, a cable that is selected during manipulation of shifting a transmission mode of a transmission lever of a bike and a ring gear that is selected through the medium of a clutching unit are fixed by transmission gear engagement, to thus softly perform a transmission mode shifting process and to thereby minimize a transmission mode shift shock.

Further, according to the present invention, since it is possible to select user's desired transmission mode gearshift regardless of speed of pedals, the transmission gear box for bikes may immediately respond to user's desired transmission ratio even at departure after stop, to thereby provide a useful effect of improving responsiveness at the time of shifting a transmission mode.

BRIEF DESCRIPTION OF DRAWINGS

The above and other objects and advantages of the invention will become more apparent by describing the preferred embodiments with reference to the accompanying drawings in which.

DETAILED DESCRIPTION OF THE INVENTION

Figure 1:
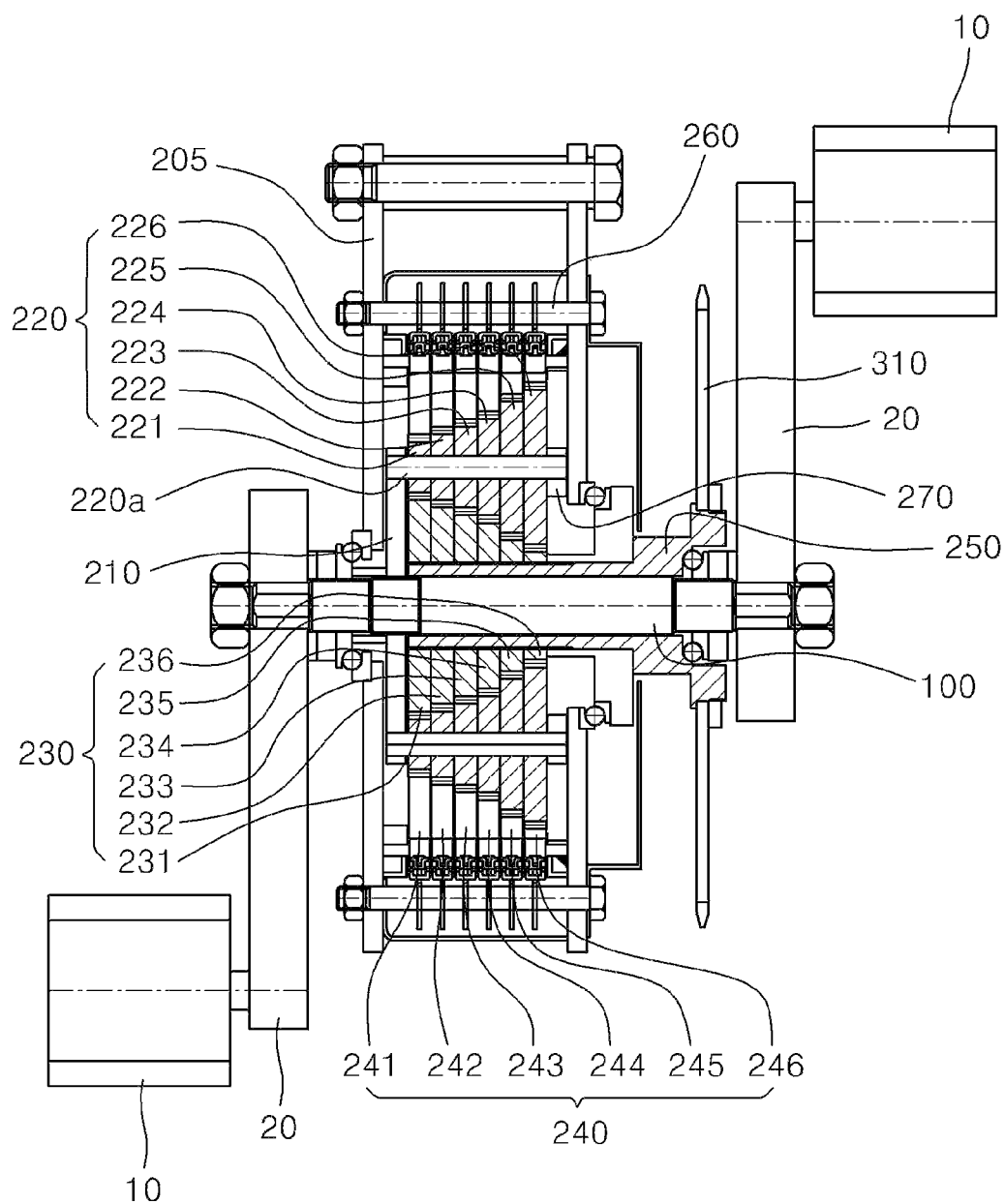
FIG. 1 is a configurational diagram illustrating a transmission gear box according to an embodiment of the present invention.
Figure 2:
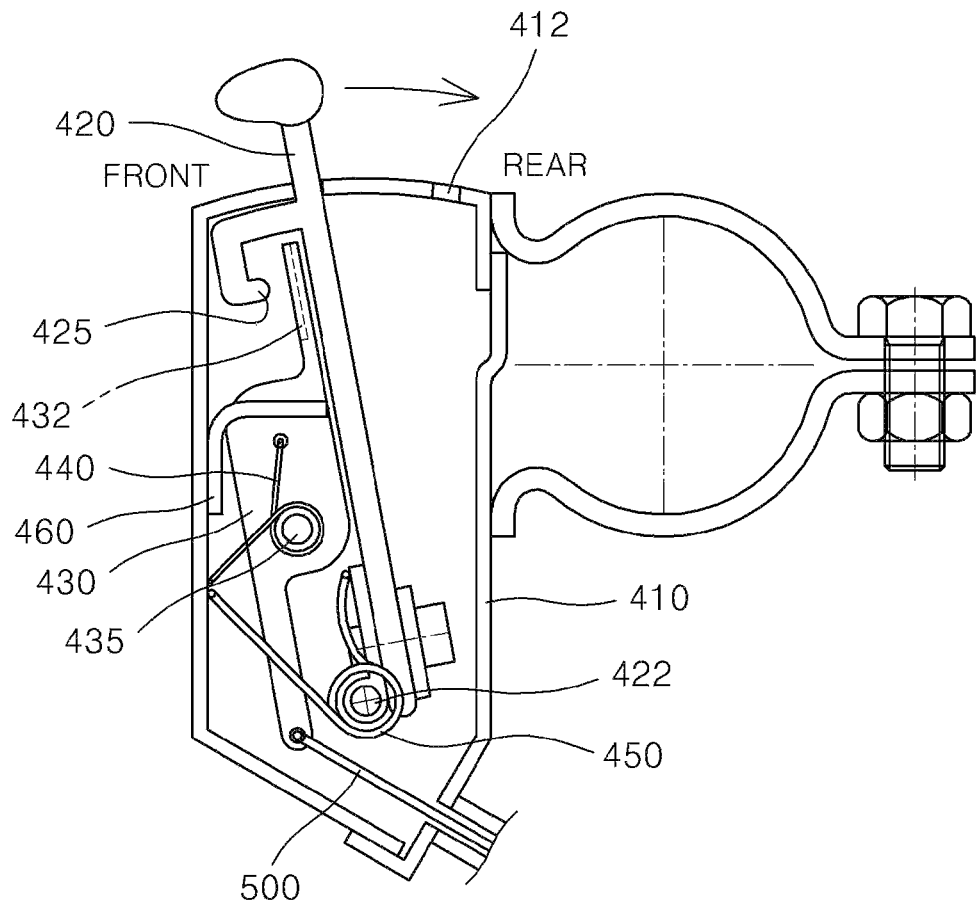
FIG. 2 is a diagram showing a configuration of a lever manipulation unit according to the present invention.
Figure 3:
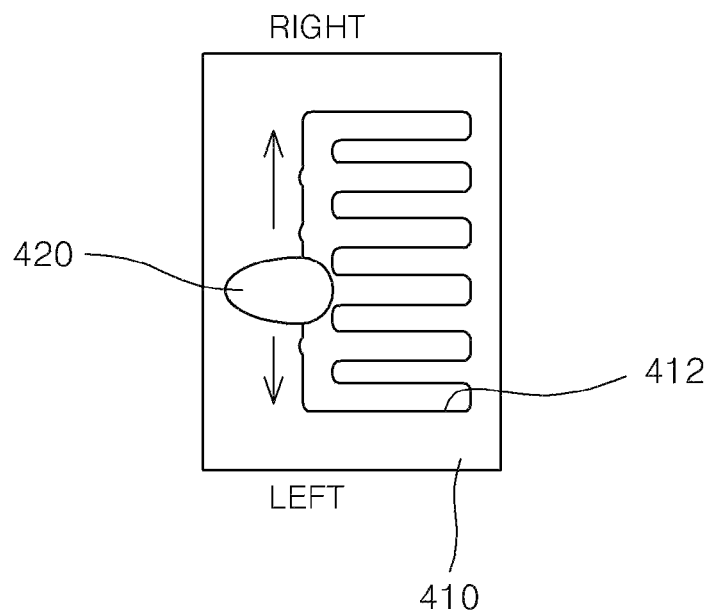
FIG. 3 is a plan view illustrating a transmission mode shift lever and a housing according to the present invention.
Figure 4:
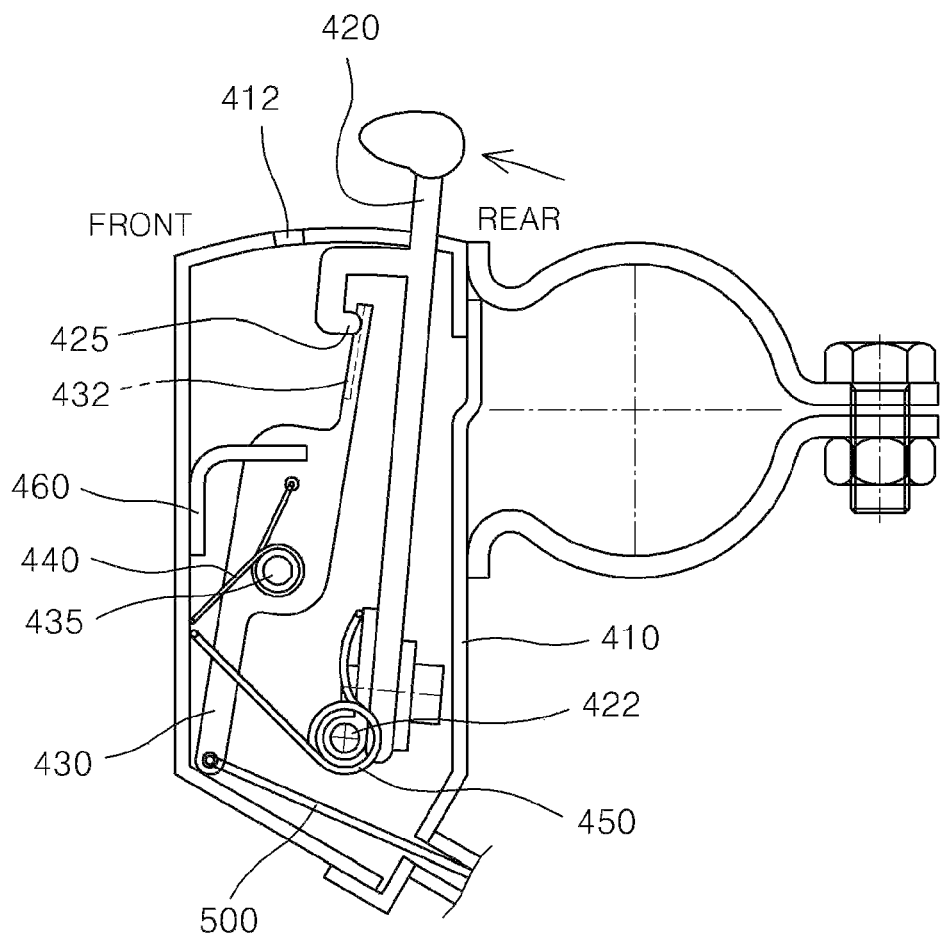
FIG. 4 is a diagram illustrating a state of using a lever manipulation unit according to the present invention.
Figure 5:
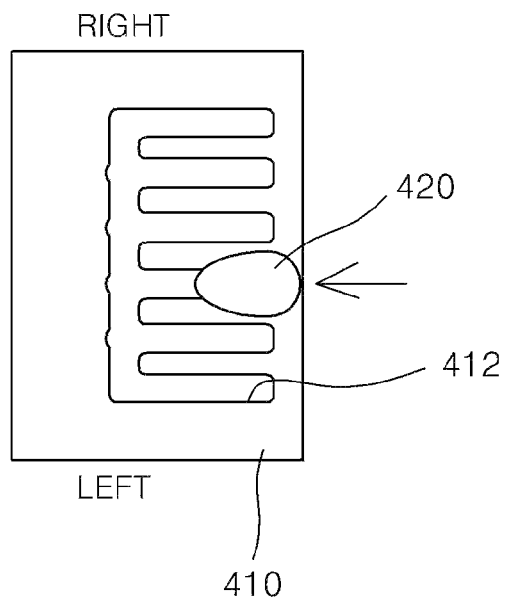
FIG. 5 is a plan view showing a shifting operation of a transmission mode shift lever according to the present invention.
Figure 6:
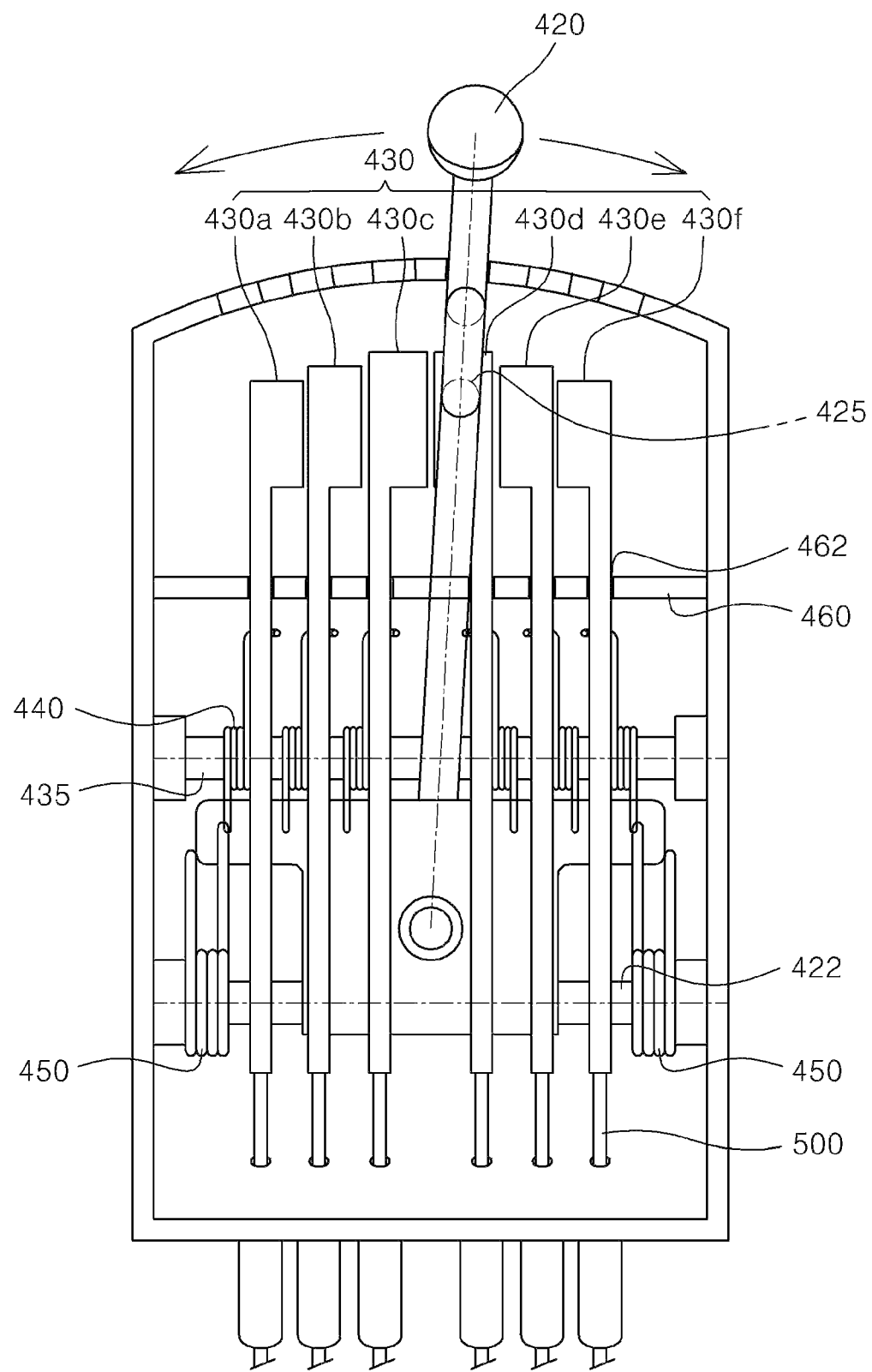
FIG. 6 is a side view showing a lever manipulation unit according to the present invention.
Figure 7:
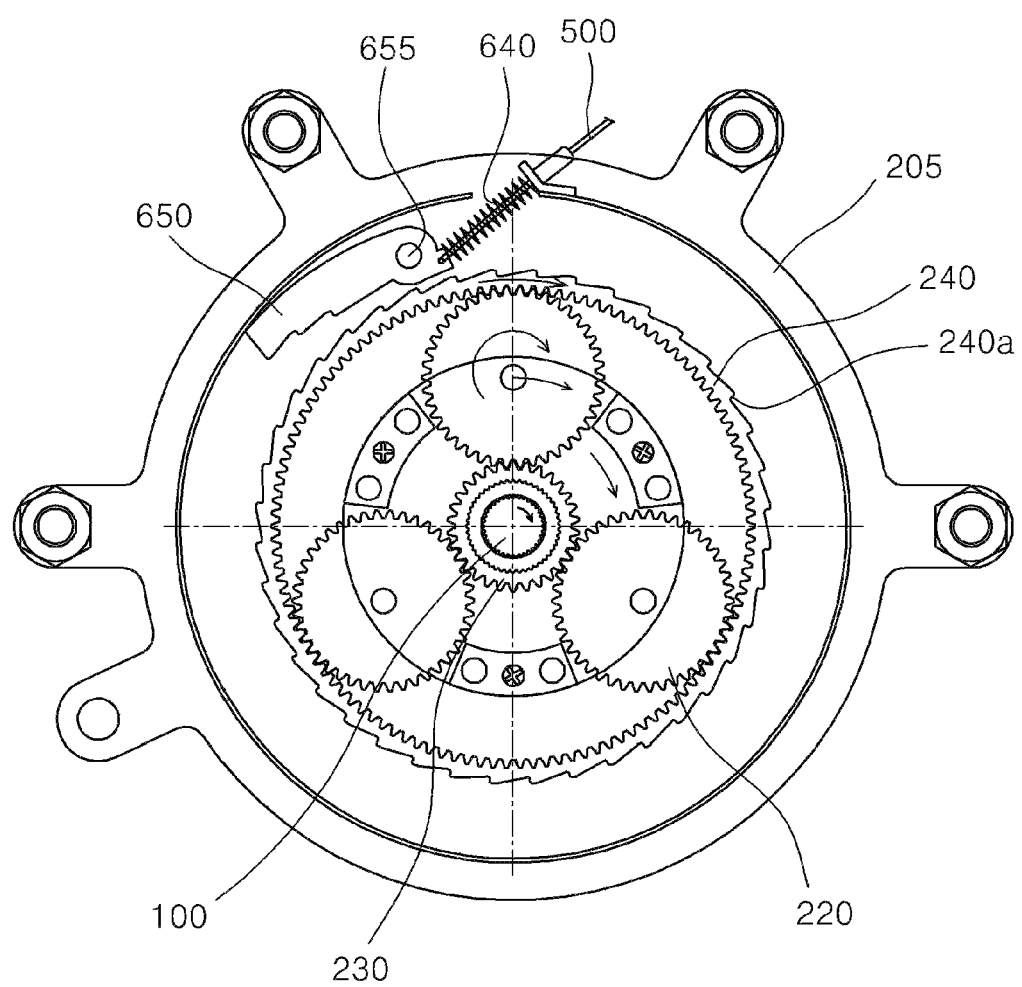
FIG. 7 is a configurational diagram illustrating an example of a clutching unit according to the present invention.
Figure 8:
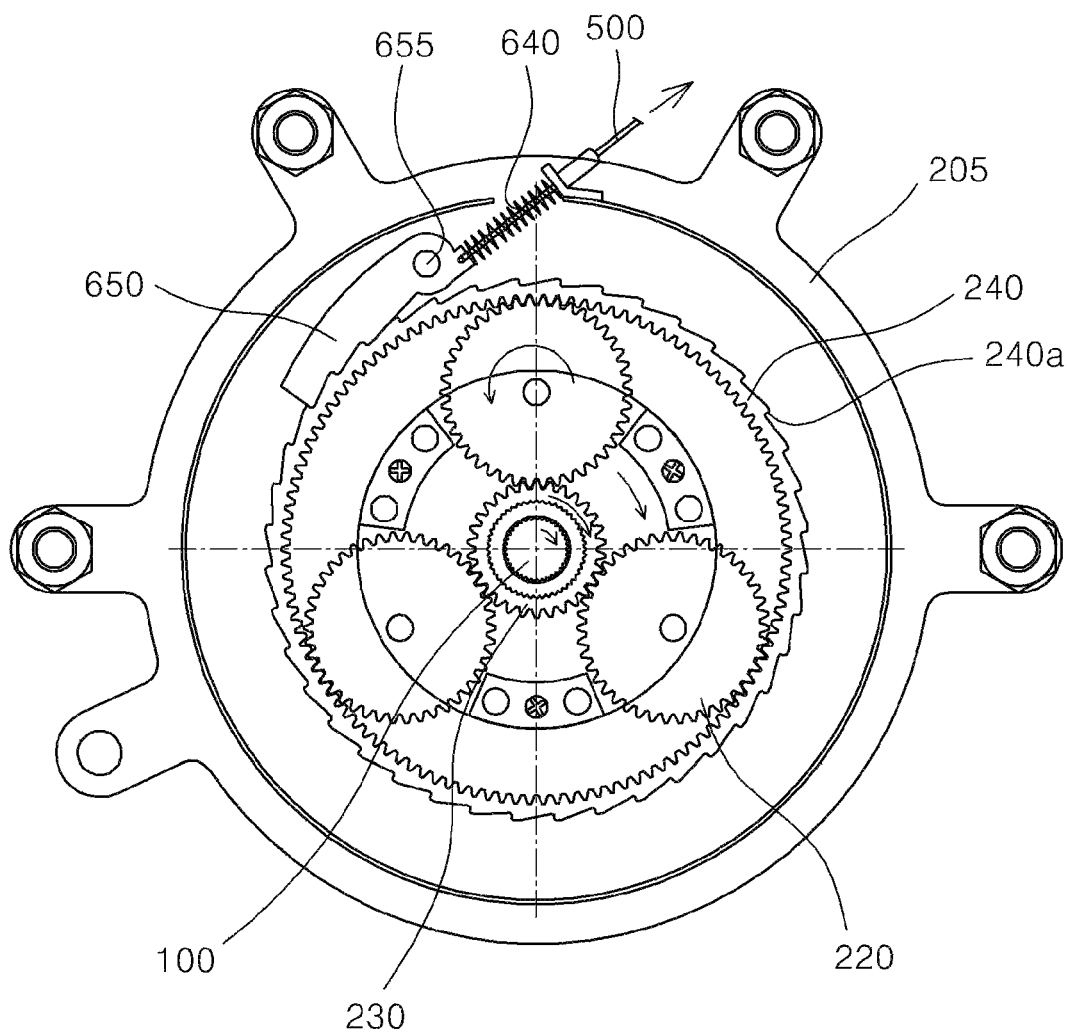
FIG. 8 is a diagram illustrating a state of using the clutching unit of FIG. 7 according to the present invention.

Hereinbelow, a transmission gear box for use in bikes according to preferred embodiments of the present invention will be described with reference to the accompanying drawings.

In recent years, a speed conversion device that is provided in the inside of a rear wheel hub for use in a bike is being developed and used, other than a general speed conversion device having gears of several diameters around axes of front and rear wheels and a chain transmitting power between the gears, to thus convert speed by changing position of the chain. In the case of the speed conversion device that is provided in the inside of a rear wheel hub, small gears are arranged in a hub shell to thus convert speed at a gear tooth ratio.

A transmission mode shifting mechanism of the speed conversion device suffers from a transmission shifting impact during performing a transmission mode shifting operation, and causes a trouble that transmission mode gearshifts should be manipulated appropriately to a running speed of a bike.

Hereafter, a transmission gear box for bikes according to respective preferred embodiments of the present invention will be described in detail with reference to the accompanying drawings.

The transmission gear box for bikes according to the present invention largely includes: crank arms that receive a rotational driving force from rotatable pedals of each bike and transmits the received rotational driving force to a main shaft; a transmission gear unit that receives the rotational driving force from the main shaft and performs a transmission mode shifting operation at a gear tooth ratio according to a selected transmission mode gearshift; a lever manipulation unit that selects one of the transmission mode gearshifts of the transmission gear unit according to manipulation of a transmission mode shift lever, to thus manipulate one of cables connected to the respective transmission mode gearshifts; and a clutching unit that is operated by one cable selected by the lever manipulation unit to thus make one of ring gears of the transmission gear unit fixed in a gear tooth engagement coupling manner and to thereby manipulate a transmission mode shifting process of the transmission gear unit.

Referring to FIGS. 1 to 8, the transmission gear box for bikes according to an exemplary embodiment of the present invention will follow. A structure of the transmission gear box for bikes includes: a main shaft 100 that receives a rotational driving force of pedals 10 of each bike through crank arms 20 and is rotated; a transmission gear unit that is axially coupled with the main shaft 100 and is interlocked and rotated, in which transmission mode gearshifts formed of respective transmission gears are arranged in parallel with each other; a lever manipulation unit that selects one of the transmission mode gearshifts of the transmission gear unit according to manipulation of a transmission mode shift lever 420, to thus manipulate one of cables 500 connected to the respective transmission mode gearshifts; and a clutching unit that manipulates operation of the transmission mode gearshifts connected with the one of the cables 500 selected at the time of the manipulation of the cables 500 by the lever manipulation unit.

In more detail, the transmission gear unit includes: a planet gear carrier 210 that is interlocked and rotated with the main gear shaft 100; a plurality of planet gears 220 (221, 222, 223, 224, 225, and 226) that are combined through the planet gear carrier 210 and a planet gear fixing pin 220a to then be interlocked and rotated, and are arranged in parallel with each other so as to correspond to respective transmission mode gearshifts; ring gears 240 (241, 242, 243, 244, 245, and 246) whose inner circumferential surfaces are coupled with outer circumferential surfaces of the planet gears 220 in a gear tooth engagement coupling manner to then be interlocked and rotated with the planet gears 220; sun gears 230 (231, 232, 233, 234, and 235) that are arranged so as to be coupled with the respective planet gears 220 by gear tooth engagement; and a sun gear shaft 250 that is spline-combined with the sun gears 230 to then be interlocked and rotated with the sun gears 230 in which a sprocket 310 is provided at one end of the sun gear shaft 250.

The sprocket 310 of the sun gear shaft 250 is connected with a chain to transfer a transmission mode shifted rotational driving force to ordinary wheels.

Gears of the transmission gear unit are accommodated in the inside of a case 205. Here, the transmission gear unit consists of six-speed transmission mode gearshifts, and includes a plurality of planet gears 220 and ring gears 240 in correspondence to the respective transmission mode gearshifts.

Hereinbelow, specific or generic reference numerals are assigned depending on the number of the respective gears.

In addition, the planet gears 220 of the transmission gear unit are engaged with gear teeth formed on the inner circumferential surfaces of the ring gears 240 at ordinary times, and are rotated in the same direction as the direction of rotation of the main shaft 100. Meanwhile, when the ring gears 240 are fixed by the clutching unit, the planet gears 220 are rotated in the opposite direction to the direction of rotation of the main shaft 100.

The planet gear fixing pin 220a is rotatably supported by a planet gear carrier cover 270 that is fixedly combined with one end of the inside of the case 205.

Each of the planet gears 220 has a different outer diameter in size so as to adjust a gear tooth ratio during performing a transmission mode shifting operation.

The clutching unit includes a pole member 650 that is interlocked by an interlocking unit according to movement of a selected cable 500 and thus interfere with one gear tooth of saw-tooth shaped gear teeth 240a to make the ring gears 240 stop, in which the saw-tooth shaped gear teeth 240a are respectively formed on the outer circumferential surfaces of the ring gears 240 that form the transmission gear unit.

The interlocking unit includes: a rotating shaft 655 that is disposed in the case 205 and with which the pole member 650 is axially rotatably combined; and a connection spring member 640 that is disposed between one end of the cable and the pole member 650 and returns the pole member 650 to an original position after completion of the manipulation of the cable.

The pole member 650 is formed with gear teeth at one side thereof, in correspondence to the gear teeth formed on the outer circumferential surfaces of the ring gears.

The connection spring member 640 employs a compression spring, and is connected to the right-hand side of the pole member 650 around the rotating shaft 655, in the drawings.

This is because the connection spring member 640 pushes the pole member 650 in a direction of releasing interference with the ring gears at ordinary times to maintain an idle rotation state of the ring gears, but is extended at the time of manipulation of the cable to make the pole member 650 rotate around the rotating shaft 655 so as to interfere with the ring gears.

Figure 9:
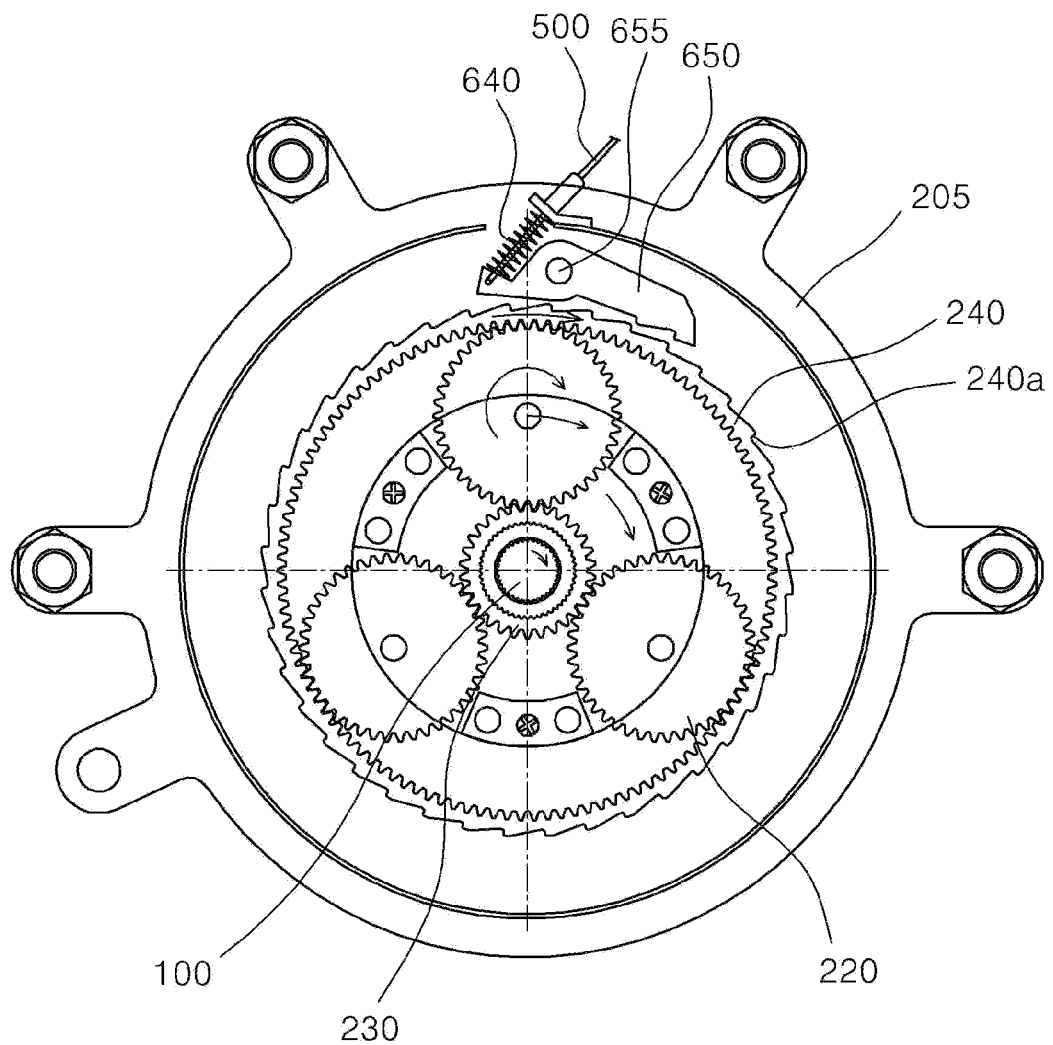
FIG. 9 is a diagram illustrating another example of a clutching unit according to the present invention.
Figure 10:
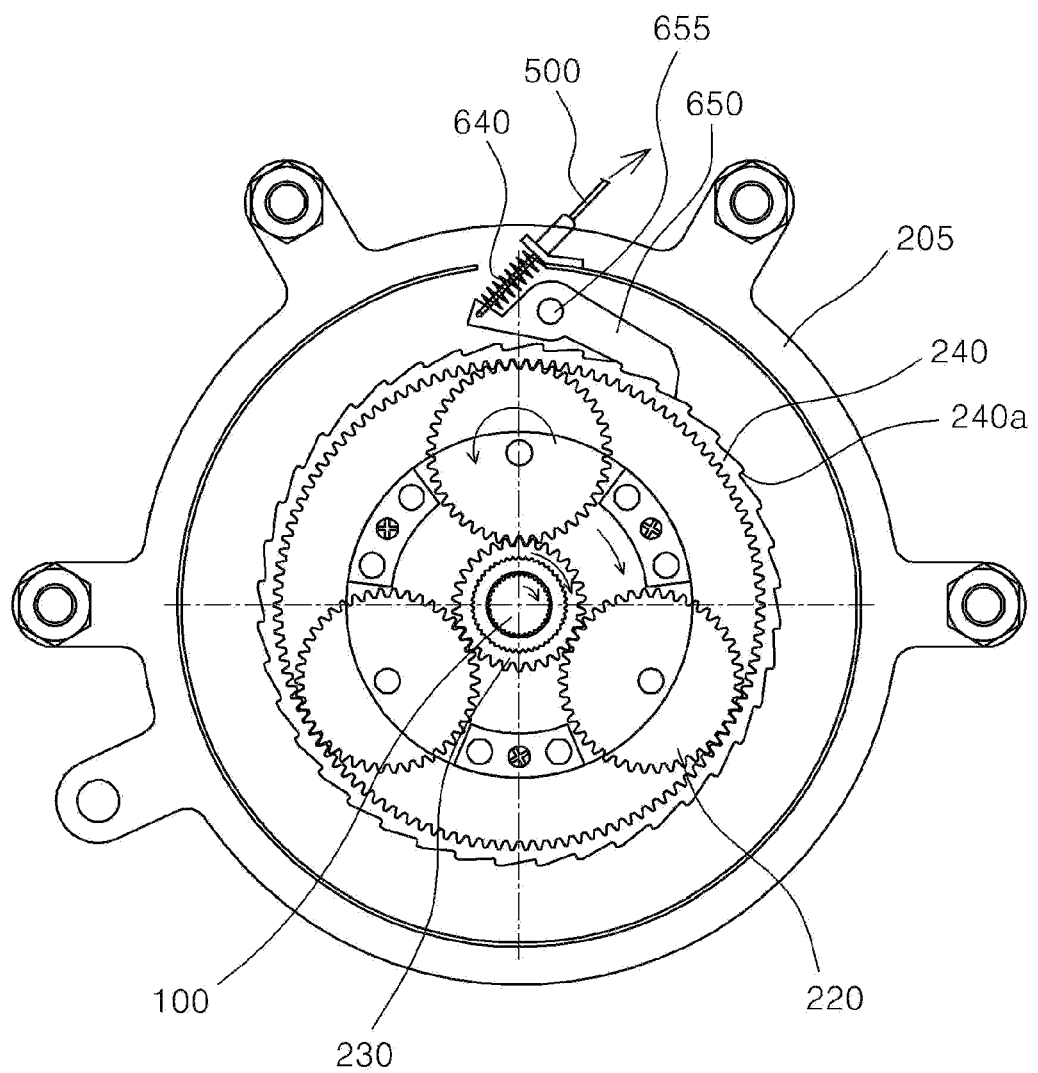
FIG. 10 is a diagram illustrating a state of using the clutching unit of FIG. 9 according to the present invention.

FIGS. 9 and 10 show other examples of using a clutching unit according to the present invention in which a connection spring member 640 is placed at a different location. Unlike the above-described explanation, the connection spring member 640 is connected to the left-hand side of the pole member 650 around the rotating shaft 655.

That is to say, the pole member 650 is placed at a location at which the pole member 650 does not interfere with the ring gears by an elastic force of the connection spring member 640 at ordinary times, but one side of the pole member 650 is engaged with the gear teeth formed on the outer circumferential surfaces of the ring gears so as to interfere with the ring gears at the time of performing a corresponding cable tension operation during manipulating a cable selected by the lever manipulation unit.

Referring back to FIGS. 1 to 8, the lever manipulation unit includes: a housing 410 that accommodates a transmission mode shift lever 420 whose upper portion is protruded upward to the outside and that is movably disposed in the front and rear directions and in the left and right directions; a plurality of manipulation levers 430 (430a, 430b, 430c, 430d, 430e, and 430f) that interfere with a portion of the transmission mode shift lever 420 according to a front-and-rear-direction shifting operation of the transmission mode shift lever 420 to then be rotated to stress one of the cables 500 and are disposed in parallel with each other in the same number as that of the respective transmission mode gearshifts of the transmission gear unit; a shift spring member 450 that is disposed in the lower portion of the transmission mode shift lever 420 to elastically support the transmission mode shift lever 420 that moves backward; and a return spring member 440 that is disposed in the lower portion of the manipulation levers 430 to elastically support the manipulation levers 430 that move forward.

The transmission mode shift lever 420 has such a structure that the lower portion of the transmission mode shift lever 420 is axially combined with a hinge axis 422 whose both ends are fixed to the left and right sides of the housing 410 and that the transmission mode shift lever 420 is rotatable back and forth around the hinge axis 422.

In addition, the housing 410 has a guide groove 412 at the upper portion thereof in which the guide groove 412 allows the transmission mode shift lever 420 to move in the left and right directions and is formed in a shape corresponding to the respective manipulation levers 430.

A lever guide 460 that does not only guide the back and forth operations of the manipulation levers 430, but also limits the left- and right-direction movements, is fixedly provided at the inner side of the front surface of the housing 410.

The housing 410 is fixedly combined on the body of a bike through clamps and the like.

The lever guide 460 includes lever guide grooves 462 that accommodate one portion of the respective manipulation levers 430 and are opened reward.

The left-and-right-direction movement of the transmission mode shift lever 420 becomes a manipulation operation for making the transmission mode shift lever 420 move to select one of the transmission mode gearshifts, and the front-and-rear-direction movement thereof becomes a manipulation operation for stressing or relaxing the cables 500 to perform a transmission mode shifting process.

Each of the manipulation levers 430 has a structure of being rotated in the forward and reward directions through a connection shaft 435 that is axially horizontally combined in the inside of the housing 410.

In addition, each of the manipulation levers 430 is formed to have an accommodating groove 432 to accommodate an end of the transmission mode shift lever 420 on one side of the upper portion thereof, and the transmission mode shift lever 420 is formed to have a stop protrusion whose end portion is bent so as to be inserted into one of the accommodating grooves 432 of the respective manipulation levers 430.

The return spring member 440 has a structure that one end of the return spring member 440 is fixed to the inner side of the front surface of the housing 410, the other end thereof is stopped by the respective manipulation levers 430 to then be fixed, and the intermediate portion thereof is wound on the outer circumferential surface of the connection shaft 435.

As a result, the return spring member 440 has a function of elastically supporting the respective manipulation levers 430 to the front side of the housing 410, and a function of assisting a forward return operation after having performed a transmission mode shifting operation of the respective manipulation levers 430.

On the other hand, the shift spring member 450 has a function of elastically supporting the transmission mode shift lever 420 to the rear side of the housing 410, and a function of supporting a reward movement of the transmission mode shift lever 420 at the time of selecting one of the transmission mode gearshifts of the transmission mode shift lever 420.

Figure 11:
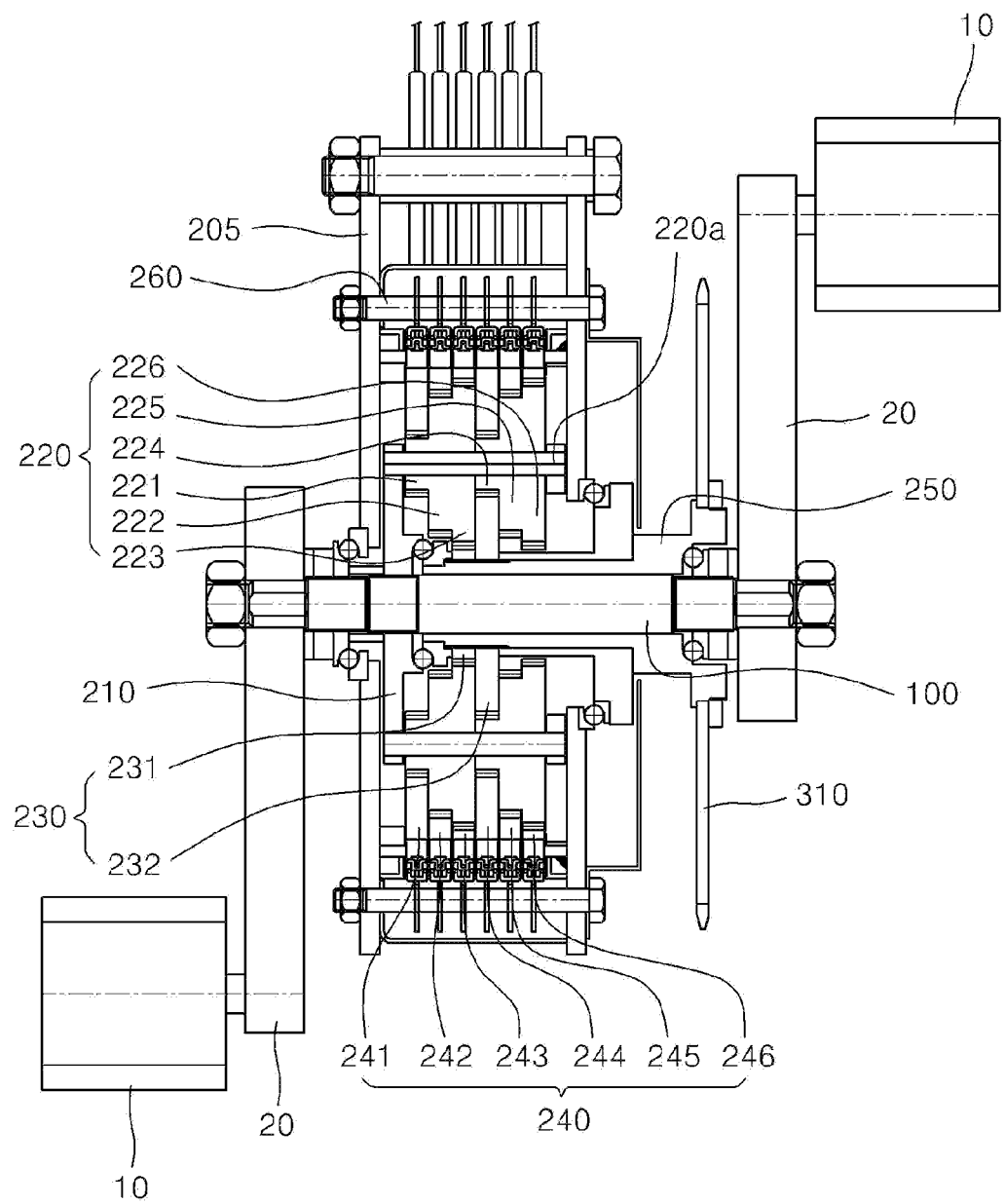
FIG. 11 is a configurational diagram illustrating a transmission gear box according to another embodiment of the present invention.

FIG. 11 is a configurational diagram illustrating a transmission gear box according to another embodiment of the present invention. Referring to FIG. 11, a transmission gear unit has a structure of performing a transmission mode shifting process by two pairs of planet gears 220 (221, 222, 223, 224, 225, and 226) and one of sun gears 230 (231 and 232) per one of ring rears 240 (241, 242, 243, 244, 245, and 246).

Each of the planet gears 220 includes a body having a small-diameter portion and a large-diameter portion whose diameters are different from each other, and has a structure of being fixedly connected by a pin on an identical axis, to thus have a structure corresponding to the planet gears on an identical axis regardless of connection of the ring gears.

In other words, one of the sun gears 230 has a structure of being combined in a gear tooth engagement coupling manner in correspondence to only one planet gear that is connected so as to make another of the planet gears 220 fixed on an identical axis.

For example, when one ring gear 241 of the ring gears 240 is fixed by the clutching unit, the planet gear 221 engaged with the ring gear 241 is rotated counterclockwise, and the planet gear 223 fixedly connected with the planet gear 221 is rotated counterclockwise, to thus transfer a rotational driving force to the sun gear 231 that is gear-tooth-engaged with the planet gear 223 and to thereby make the sun gear 231 rotated clockwise.

Accordingly, the sun gear shaft 250 that is spline-combined with the sun gear 231 is rotated clockwise, to thereby transfer a transmission mode shifted rotational driving force to the sprocket 310 at a gear tooth ratio between the respective gears.

The transmission gear box may be embodied in various structures according to other embodiments of the present invention. Accordingly, the transmission gear box may perform a transmission mode shifting operation at a variety of transmission modes according to a gear tooth ratio between the transmission mode shifting gears.

In other words, transmission mode shifting gears differing from the above-mentioned transmission mode shifting gears may be disposed.

Figure 12:
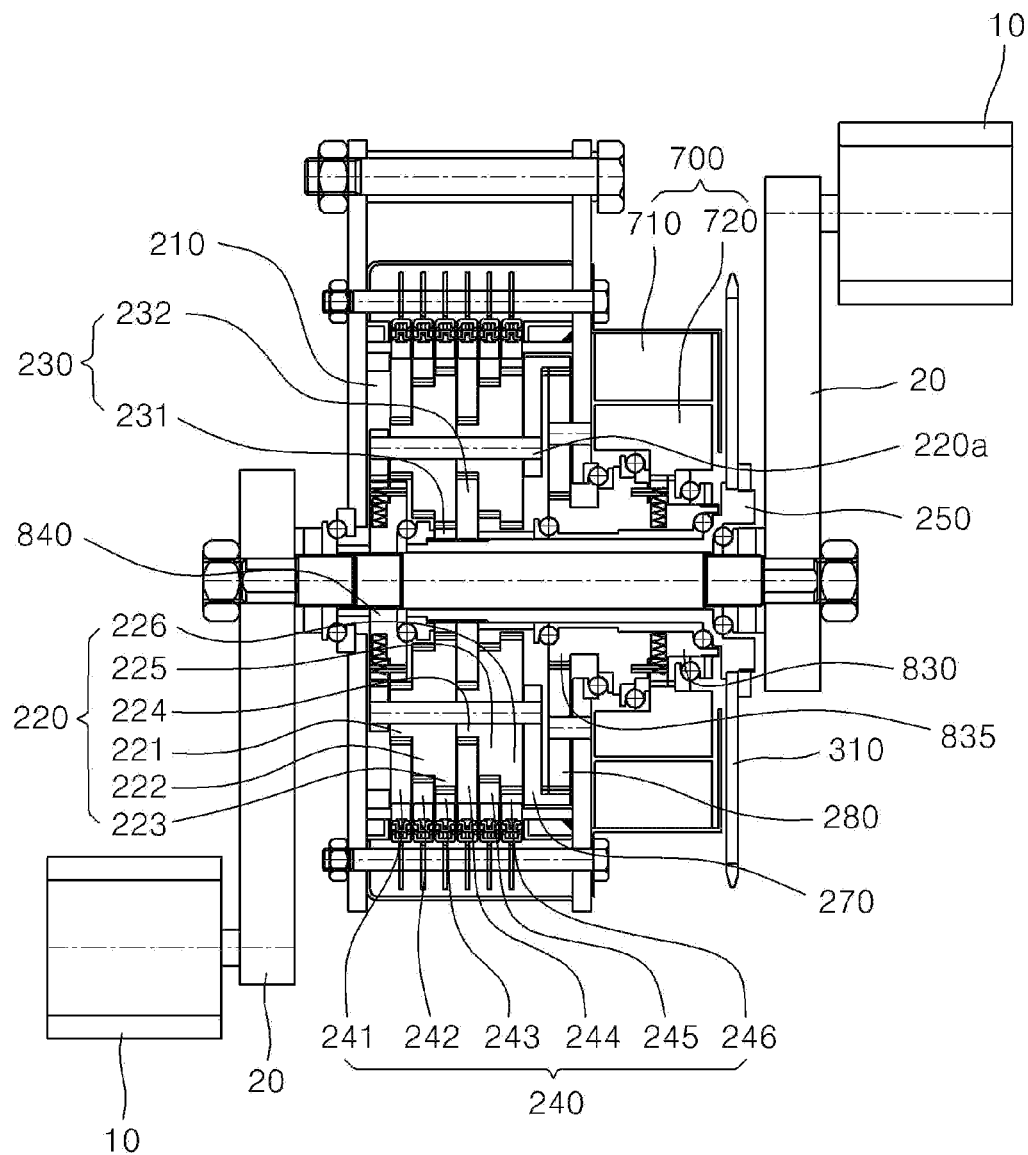
FIG. 12 is a configurational diagram illustrating a transmission gear box according to still another embodiment of the present invention.

FIG. 12 is a configurational diagram illustrating a transmission gear box according to still another embodiment of the present invention. The transmission gear box of FIG. 12 further includes a power transmission unit that transfers a rotational driving force of a motor to a transmission gear unit.

In more detail, the power transmission unit includes: a motor 700 having a stator 710 and a rotor 720; an auxiliary sun gear shaft 830 that is combined with the rotor 720 by gear tooth engagement; an auxiliary sun gear 835 that is disposed at an end of the auxiliary sun gear shaft 830; auxiliary planet gears 280 that are combined with the auxiliary sun gear 835 in a gear tooth engagement coupling manner and that are pin-combined in the inner side surface of the case 205; and a planet gear carrier cover 270 that is combined with the auxiliary planet gear 280 in a gear tooth engagement coupling manner to then be interlocked and rotated with the auxiliary planet gear 280, and that is connected with a planet gear fixing pin 220a that is axially combined with the planet gears 220, to thus transfer a rotational driving force to a sprocket 310.

In addition, the power transmission unit includes a one-way clutch unit to transfer a rotational driving force of the motor 700 and a rotational driving force of the main shaft 100 in one direction.

The one-way clutch unit includes a first clutch that is disposed between the rotor 720 and the auxiliary sun gear shaft 830, and a second clutch that is disposed between the main shaft 100 and the planet gear carrier 210.

Figure 13:
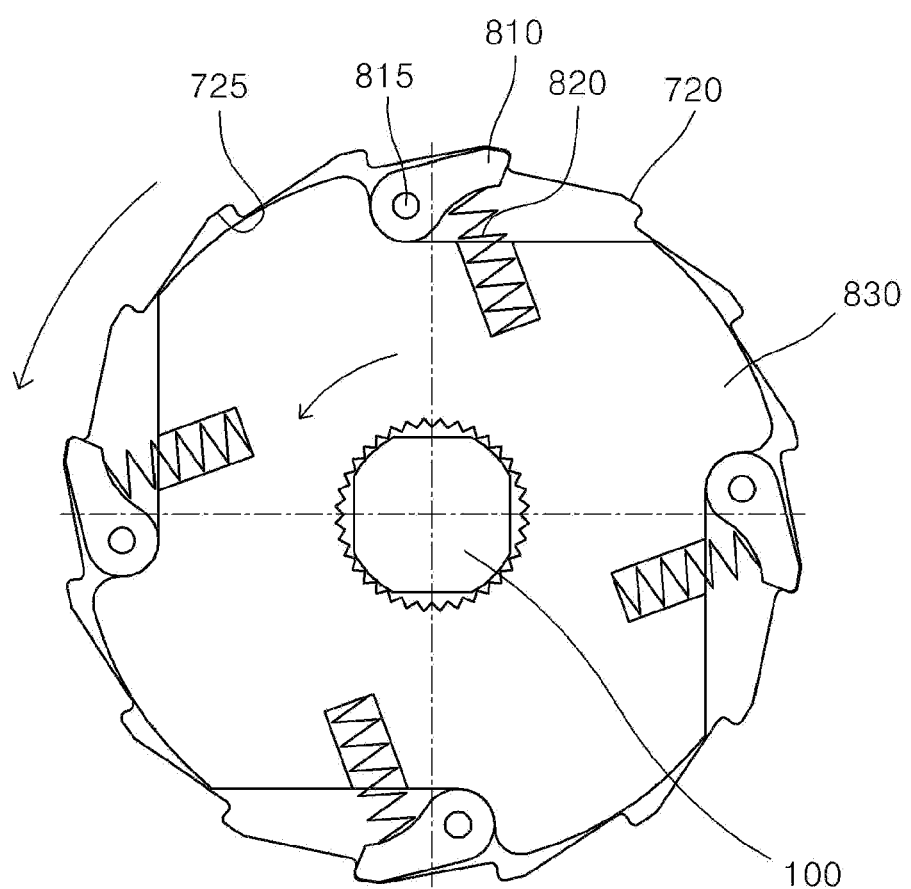
FIG. 13 is a front view showing a first clutch according to the present invention.

As shown in FIG. 13, the first clutch is formed to have a saw-tooth shaped gear teeth 725 formed on the inner circumferential surface of the rotor 720 of the motor 700, and includes a one-way stopper 810 that is disposed on the outer circumferential surface of the auxiliary sun gear shaft 830 and that is rotatably elastically supported to the outside by a one-way spring member 820.

The one-way spring member 820 is disposed to be accommodated in the inside of the auxiliary sun gear shaft 830, and elastically supports the one-way stopper 810 in a direction of pushing the one-way stopper 810 to the outside.

The one-way stopper 810 is rotatably disposed through a rotating pin 815 that is pin-combined with the auxiliary sun gear shaft 830.

The one-way stopper 810 performs a function of allowing the rotor 720 of the motor 700 to rotate in one direction and preventing the rotor 720 from rotating in the other direction.

In other words, when the rotor 720 of the motor 700 is rotated counterclockwise, a counterclockwise rotational driving force is transferred to the auxiliary sun gear shaft 830 through the one-way stopper 810, but when the rotor 720 of the motor 700 is rotated clockwise, the rotor 720 is in an idle state.

Figure 14:
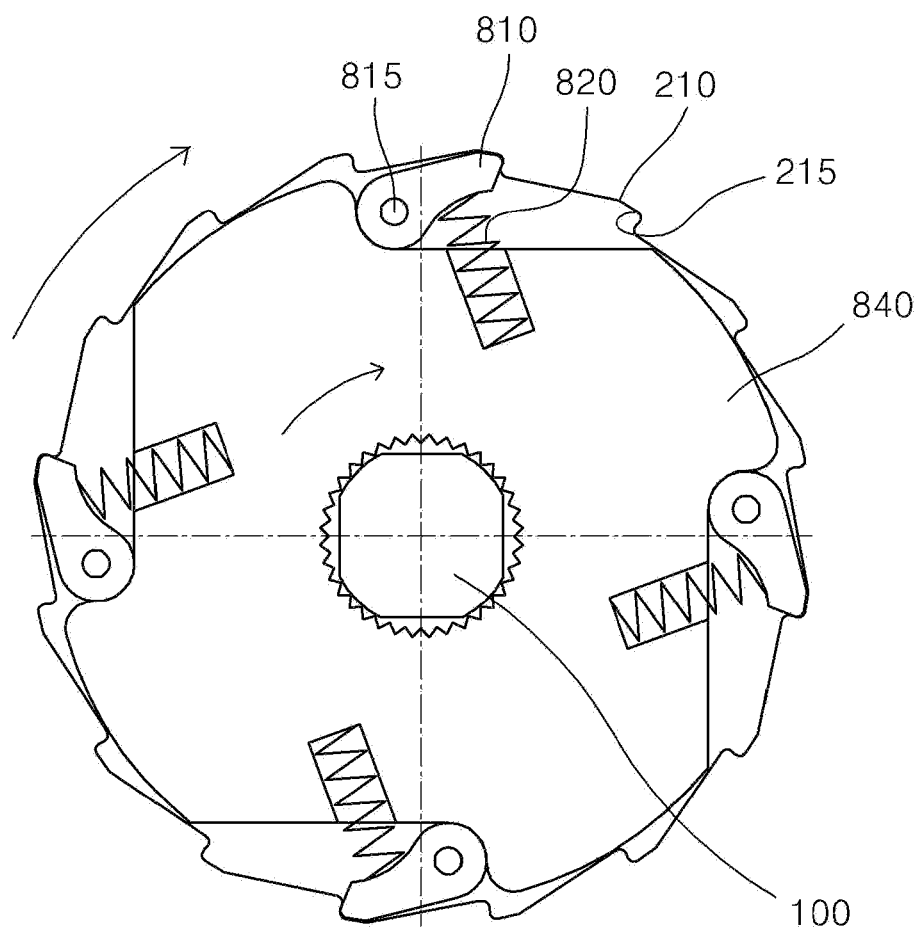
FIG. 14 is a front view showing a second clutch according to the present invention.

As shown in FIG. 14, the second clutch is formed to have a saw-tooth shaped gear teeth 215 formed on the inner circumferential surface of the planet gear carrier 210, and includes a rotating clutch 840 that is disposed between the main shaft 100 and the planet gear carrier 210 and is interlocked and rotated according to a rotational driving force of the main shaft 100, and a one-way stopper 810 that is disposed on the outer circumferential surface of the rotating clutch 840 and that is rotatably elastically supported to the outside by a one-way spring member 820.

The second clutch transfers a rotational driving force to the planet gear carrier 210 through the rotating clutch 840 only when the main shaft 100 is rotated in a clockwise direction, but when the main shaft 100 is rotated in a counterclockwise direction, the main shaft 100 is in an idle state.

The one-way spring member 820 and the one-way stopper 810 have a function of making the main shaft 100 rotated in one direction contrary to the one-way spring member 820 and the one-way stopper 810 of FIG. 13. Since the rotating direction of FIG. 14 differs from that of FIG. 13 and the second clutch of FIG. 14 has the same function of allowing only a unidirectional rotation as the first clutch of FIG. 13, the detailed description thereof will be omitted.

When a rotational driving force of the motor 700 is transferred to the transmission gear unit, the rotational driving force is transferred to the auxiliary sun gear shaft 830 and the auxiliary sun gear 835, via the first clutch from the rotor 720, and the rotational driving force is transferred to the planet gears via the planet gear cover 270 that is combined with the auxiliary sun gear 835 in a gear tooth engagement coupling manner and the planet gear fixing pin 220a.

Then, since the ring gear 240 corresponding to the transmission mode gearshift selected through the lever manipulation unit is fixed, a process of transferring a rotational driving force of the sun gear engaged with the planet gear is the same as those of the above-described embodiments.

Also, the second clutch transfers a rotational driving force of the main shaft 100 to the planet gear carrier 210, in a clockwise direction that is unidirectional. A power transmission process of transferring a rotational driving force to the planet gear is the same as those of the above-described embodiments.

Figure 15:
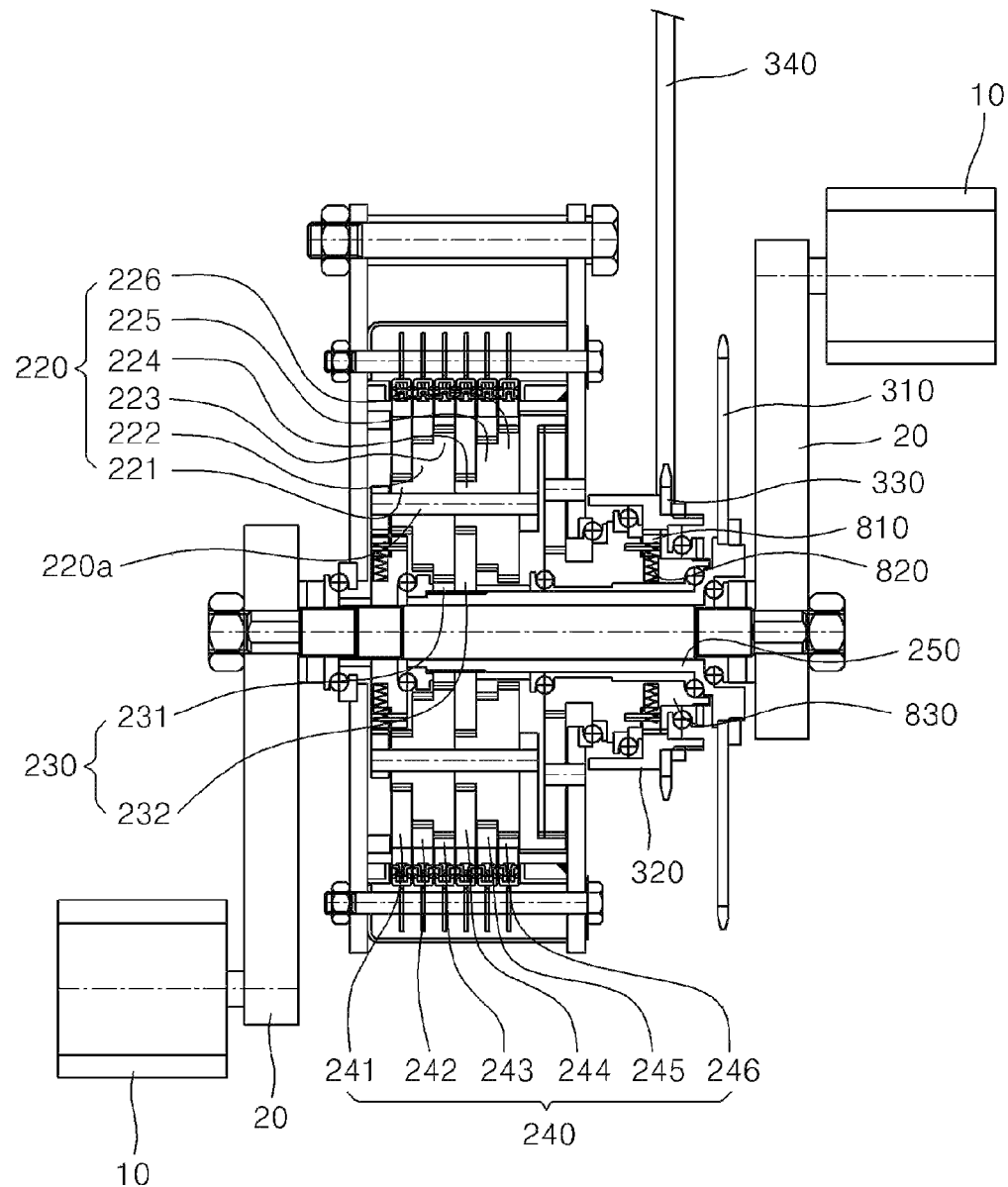
FIG. 15 is a configurational diagram illustrating a state of using a transmission gear box according to another embodiment of the present invention.
Figure 16:
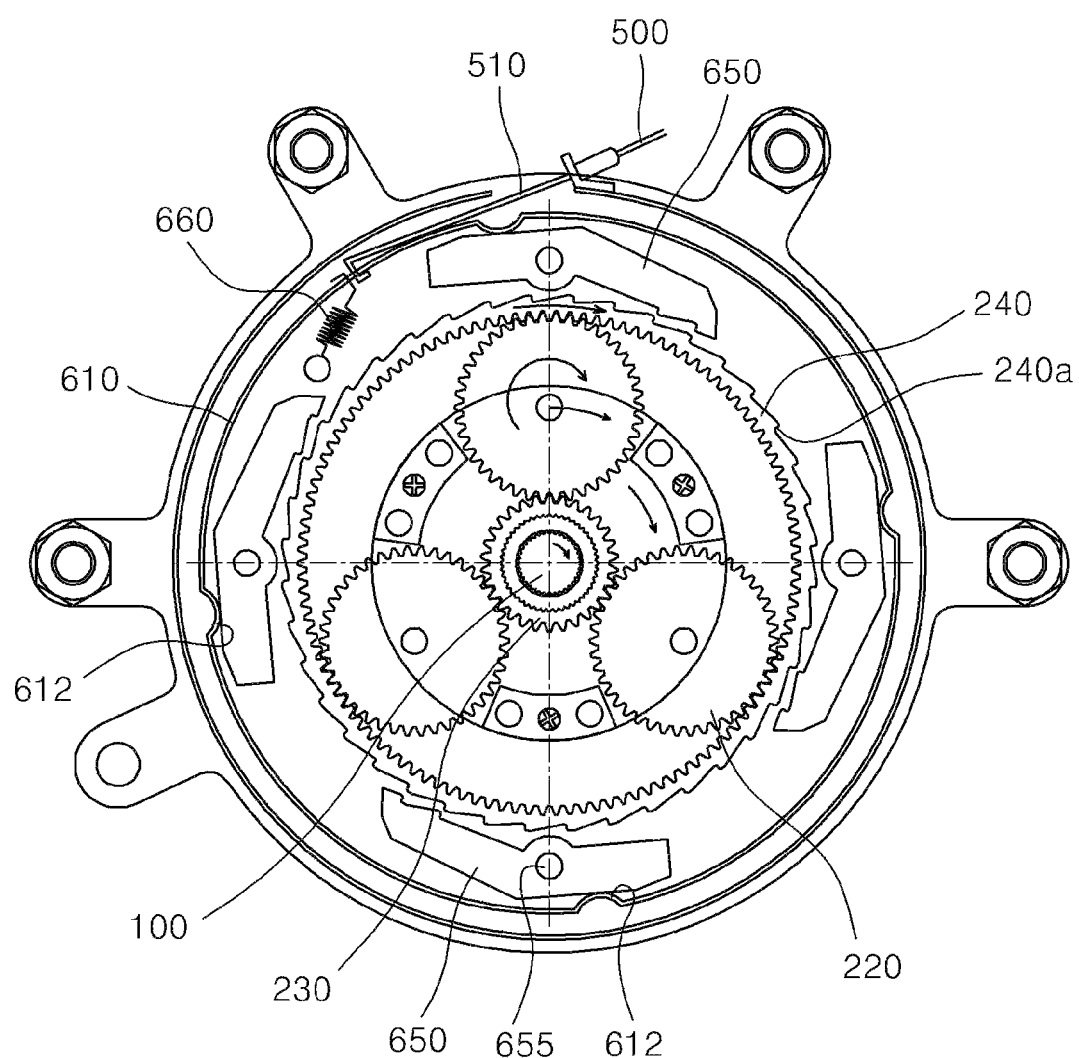
FIG. 16 is a diagram showing an interlocking unit according to an embodiment of the present invention.
Figure 17:
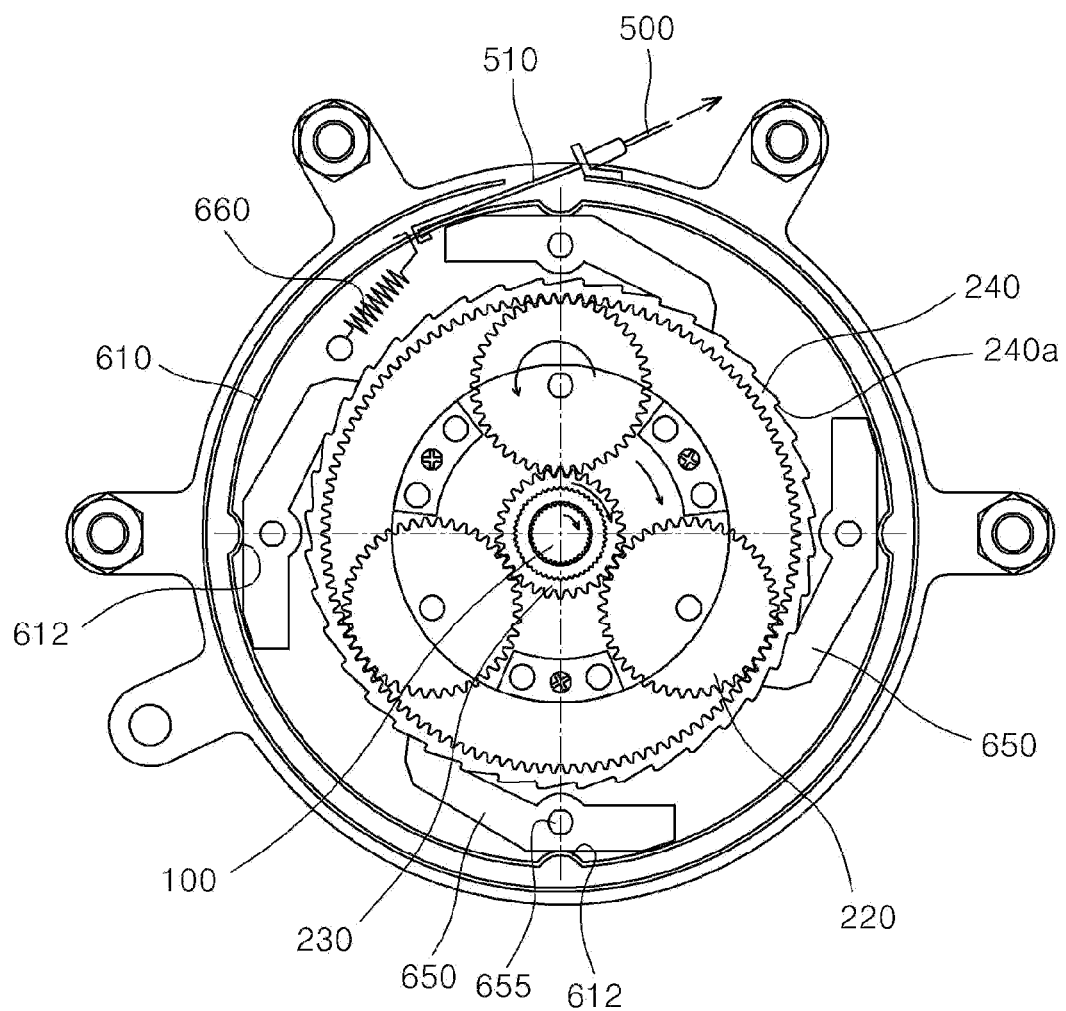
FIG. 17 is a diagram showing a state of using the interlocking unit of FIG. 16.
Figure 18:
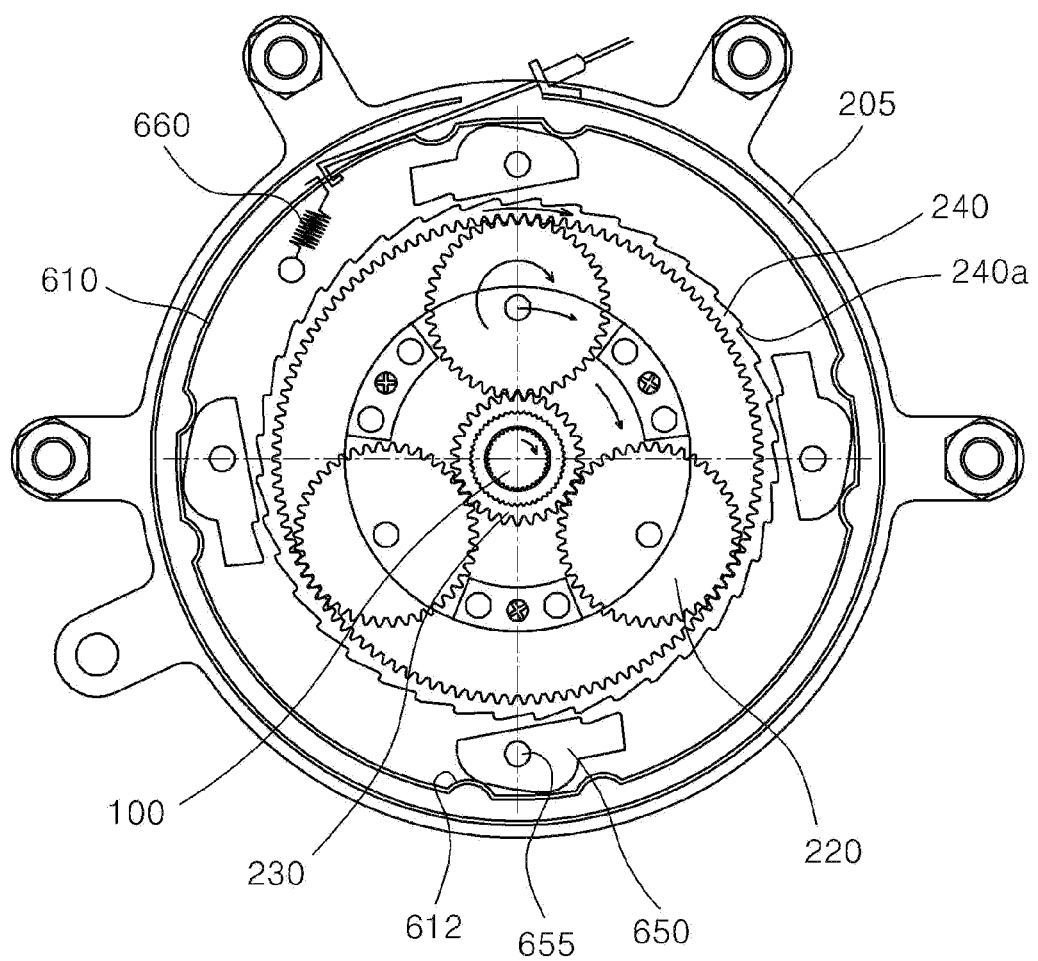
FIG. 18 is a diagram showing an interlocking unit according to another embodiment of the present invention.
Figure 19:
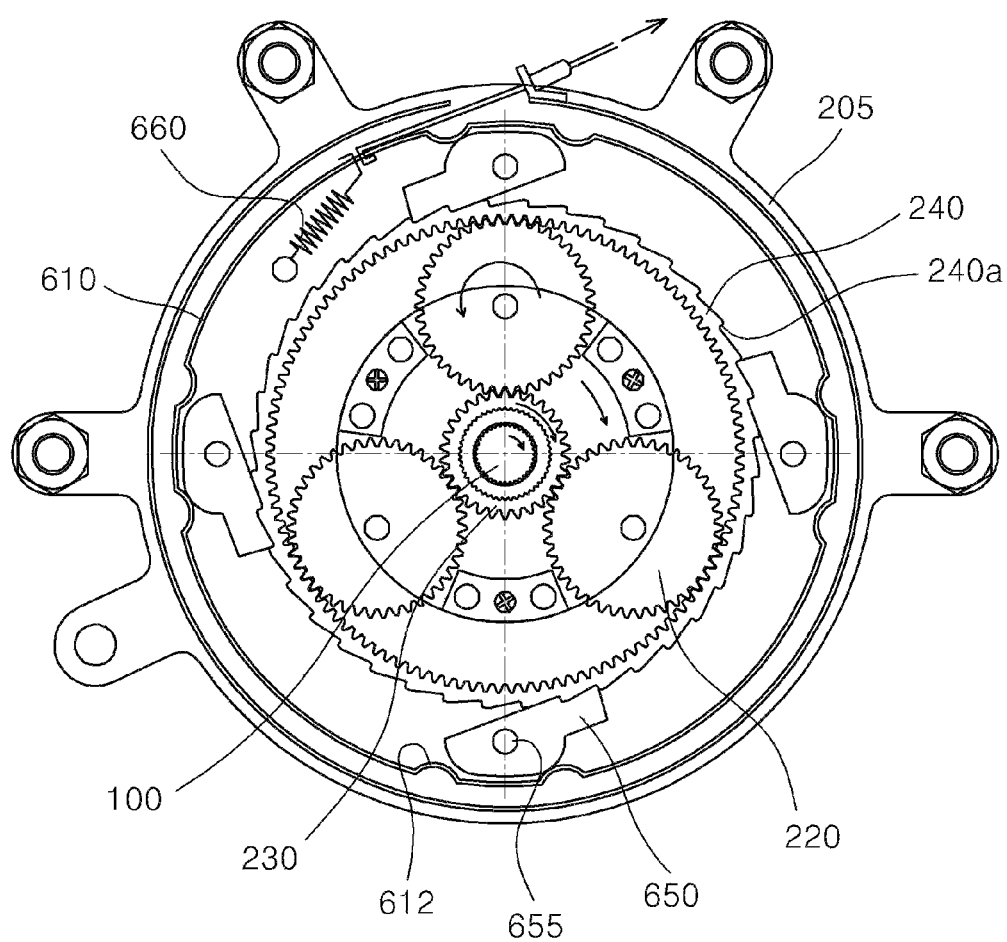
FIG. 19 is a diagram showing a state of using the interlocking unit of FIG. 18.

FIG. 15 is a configurational diagram illustrating a state of using a transmission gear box according to another embodiment of the present invention. That is, the transmission gear box of FIG. 15 further includes a power connection unit through which an external power is transferred instead of a motor. The power connection unit includes: an auxiliary sun gear shaft 830 that is interlocked and rotated in one direction through a one-way clutch that is provided on the outer side of a sun gear shaft 250; a clutch plate 320 that is disposed to be interlocked on the outer side of the auxiliary sun gear shaft 830 and on the outer circumferential surface of which an auxiliary sprocket 330 is disposed; and a belt chain 340 that is connected to the auxiliary sprocket 330 through which an external power is transferred.

This may allow the external power to be transferred to the transmission gear unit without limiting position of the motor.

The functions of the above-described embodiments of the present invention having these configurations are as follows.

When a treading force of the pedals 10 is transferred to the main shaft 100 through the crank arms 20 in the transmission gear box for bikes according to the present invention, the planet gear carrier 210 connected with the main shaft 100 is interlocked and rotated and a rotational driving force of the planet gear carrier 210 is transferred to the planet gears 220 of the transmission gear unit via the connected planet gear fixing pin 220a.

Here, the planet gears 220 of the transmission gear unit are engaged with the gear teeth formed on the inner circumferential surfaces of the ring gears at ordinary times, and thus are rotated together with the ring gears 240 in the same direction as that of the main shaft 100, but when one ring gear is selected by the clutching unit and thus rotation of the selected ring gear is fixed, the planet gears 220 are rotated in a direction opposed to that of the main shaft 100.

The operations of the clutching unit are divided into an operation of the lever manipulation unit and an operation of fixing the ring gear selected by the lever manipulation unit.

The transmission mode shift lever 420 of the lever manipulation unit is located at the rear side of the guide groove 412 of the housing 410 corresponding to the latest selected transmission mode gearshift by the elastic supporting force of the shift spring member 450 at ordinary times other than a transmission mode shifting process.

This is because the elastic supporting force of the shift spring member 450 that elastically supports the transmission mode shift lever 420 to the rear side of the housing 410 is larger than a sum of the elastic supporting force of the return spring member 440 that elastically supports the forward movement of the manipulation lever 430 and the elastic supporting force of the connection spring 630 that supports the cable 500 in a cable relaxing direction.

If the transmission mode shift lever 420 is moved to a position where the transmission mode shift lever 420 may move in the left and right directions from the rear side of the housing 410 to the front side thereof by a user, at a time of performing a transmission mode shifting operation, and then a manipulating force of the transmission mode shift lever 420 is removed from a position of a groove at a desired transmission mode gearshift, the transmission mode shift lever 420 is made to move to the rear side of the housing 410 by an elastic supporting force of the shift spring member 450 that elastically supports the transmission mode shift lever 420 to the rear side of the housing 410, and then is fixed.

When the transmission mode shift lever 420 is made to move to the rear side of the housing 410, a stopper of the transmission mode shift lever 420 is inserted into and accommodated in an accommodation groove of one manipulation lever 430 of a number of the manipulation levers 430, and then the selected manipulation lever 430 is made to rotate according to rotation of the transmission mode shift lever 420.

The manipulation lever 430 is rotated around the connection shaft 435.

When the manipulation lever 430 is rotated, the upper portion of the manipulation lever 430 is reflexed to the rear side of the housing 410 around the connection shaft 435, but the lower portion thereof is moved to the front side of the housing 410.

As a result, the cable 500 that is connected to the lower portions of the manipulation lever 430 is pulled and stressed by rotation of the manipulation lever 430.

Here, a cable 500 is connected to each of the manipulation levers 430, and one of the cables 500 is stressed depending on movement of a selected manipulation lever 430 of a number of the manipulation levers 430.

When a cable 500 is pulled and stressed, the connection spring member 640 connected to the other end of the cable 500 is extended, and the pole member 650 connected to the extended connection spring member 640 is made to rotate around the rotating shaft 655, to thus make one side portion of the pole member 650 engaged with and interfere with the gear teeth on the outer circumferential surface of the ring gear.

In other words, the connection spring member 640 pushes the pole member 650 in a direction of releasing interference with the ring gears at ordinary times to maintain an idle rotation state of the ring gears, but is extended at the time of manipulation of the cable to make the pole member 650 rotate around the rotating shaft 655 so as to interfere with the ring gears. As a result, the selected ring gear is stopped.

When the ring gear is stopped, the planet gear that is engaged with the ring in a gear tooth engagement coupling manner is rotated in a counterclockwise direction by a clockwise rotational driving force that is transferred via the planet gear carrier 210.

When the planet gears 220, or the other planet gears 220 that are fixedly connected to the selected planet gear are rotated counterclockwise, the sun gears 230 that are combined with the planet gears 220 in a gear tooth engagement coupling manner are rotated clockwise.

Then, the sun gear shaft 250 that is spline-combined with the sun gears 230 is rotated in a clockwise direction, and the sprocket 310 mounted on the outer side of the sun gear shaft 250 is made to rotate.

When the rotational driving force is transferred to the sprocket 310, a power transmission process of transferring a transmission mode shifted rotational driving force to wheels of a bike via a chain connected to the sprocket 310 is performed.

Here, based on speeds of the main shaft 100 and the sprocket 310 during performing a transmission gear shift operation through the transmission gear unit, a case that the number of rotations of the sprocket 310 becomes faster is called a high speed transmission mode, and the opposite case is called a low speed transmission mode.

When a transmission mode shifting operation is performed according to manipulation of the transmission mode shift lever, only one of a plurality of pole members 650 makes a ring gear corresponding to a selected transmission mode gearshift fixedly stopped, but the other pole members 650 do not interfere with the ring gears.

Therefore, the rest of the ring gears are interlocked with the rotational operations of the planet gears, but are in an idle state, so as not to affect rotation of the planet gears.

In the case that a transmission mode shifting operation is performed from a low speed transmission mode to a high speed transmission mode, or from a high speed transmission mode to a low speed transmission mode, the ring gears 240 corresponding to the respective transmission mode gearshifts are fixed and the planet gears that are respectively combined with the ring gears in a gear tooth engagement coupling manner are transmission mode shifted, to thereby perform a natural transmission mode sifting operation regardless of a running speed.

FIGS. 16 to 19 show interlocking units according to other embodiment of the present invention, respectively. Each of the interlocking units includes: a rotating shaft 655 with which a pole member 650 is axially combined to then be rotated; and a clutch ring member 610 that is disposed between an end of a cable and the pole member 650 and is interlocked according to movement of the cable to thus control an interference operation with the ring gear by a portion contacting the pole member 650.

In the interlocking unit according to one embodiment of the present invention, the clutch ring member 610 is connected to the end of the cable through a connector 510.

The connector 510 has a connection structure in which the end of the connector 510 is bent and fitted with the clutching ring member to then be interlocked with the clutching ring member.

Also, the clutch ring member 610 is formed to have a bent contact portion 612 to contact the pole member 650 at a portion corresponding to the pole member 650, and is connected to a tension spring member 660 that makes the clutch ring member 610 return to an original position when manipulation of the cable is completed.

The tension spring member 660 has a structure that one end of the tension spring member 660 is connected with the clutch ring member 610 and the other end thereof is fixed to the case.

In other words, the tension spring member 660 is extended during performing a tension operation of the cable, and is contracted when manipulation of the cable is completed, to thus make the clutch ring member 610 return to the original position.

In the interlocking unit according to the other embodiment of the present invention, a tensile force is transferred to the clutch ring member 610 via the connector 510 at the time of performing a cable stressing operation of a cable selected by the lever manipulation unit. Accordingly, the clutch ring member 610 is rotated and thus the contact portion 612 makes the pole member 650 pivoted toward the ring gear, to thereby make the mutual gear teeth interfere with each other and make a selected ring gear fixed.

Since the transmission mode shifting operations are same as those of the above-described previous embodiments, the description thereof will be omitted.

Meanwhile, when manipulation of the cable is completed, the clutch ring member 610 returns to its original position by a restoring force of the tension spring member 660, and the pole member 650 is rotated around the rotating shaft 655 when the contact portion 612 of the clutch ring members 610 contacts another portion of the pole member 650, to thereby release an interference between the pole member 650 and the ring gear.

Therefore, the pole member 650 and the ring gear are separated from each other, and the ring gear is kept in an idle state.

Figure 20:
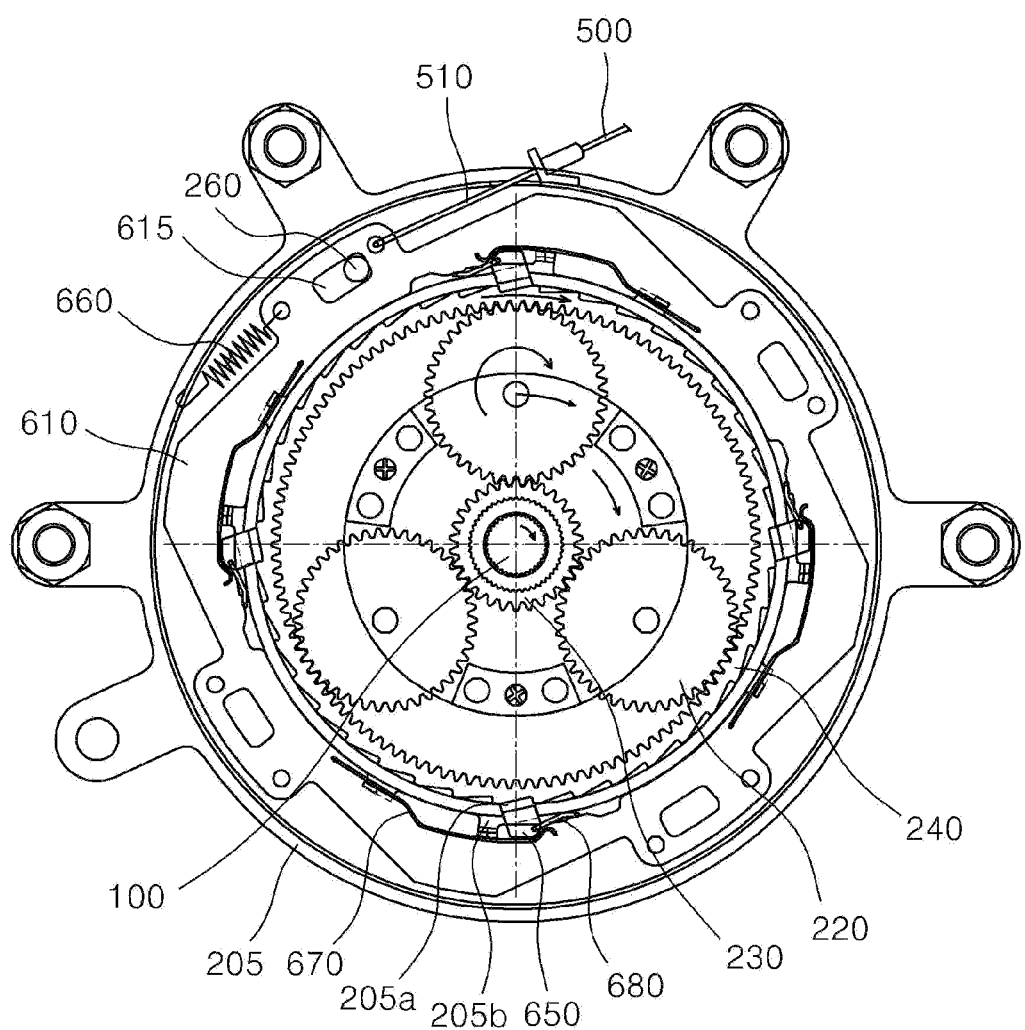
FIG. 20 is a diagram showing an interlocking unit according to still another embodiment of the present invention.
Figure 21:
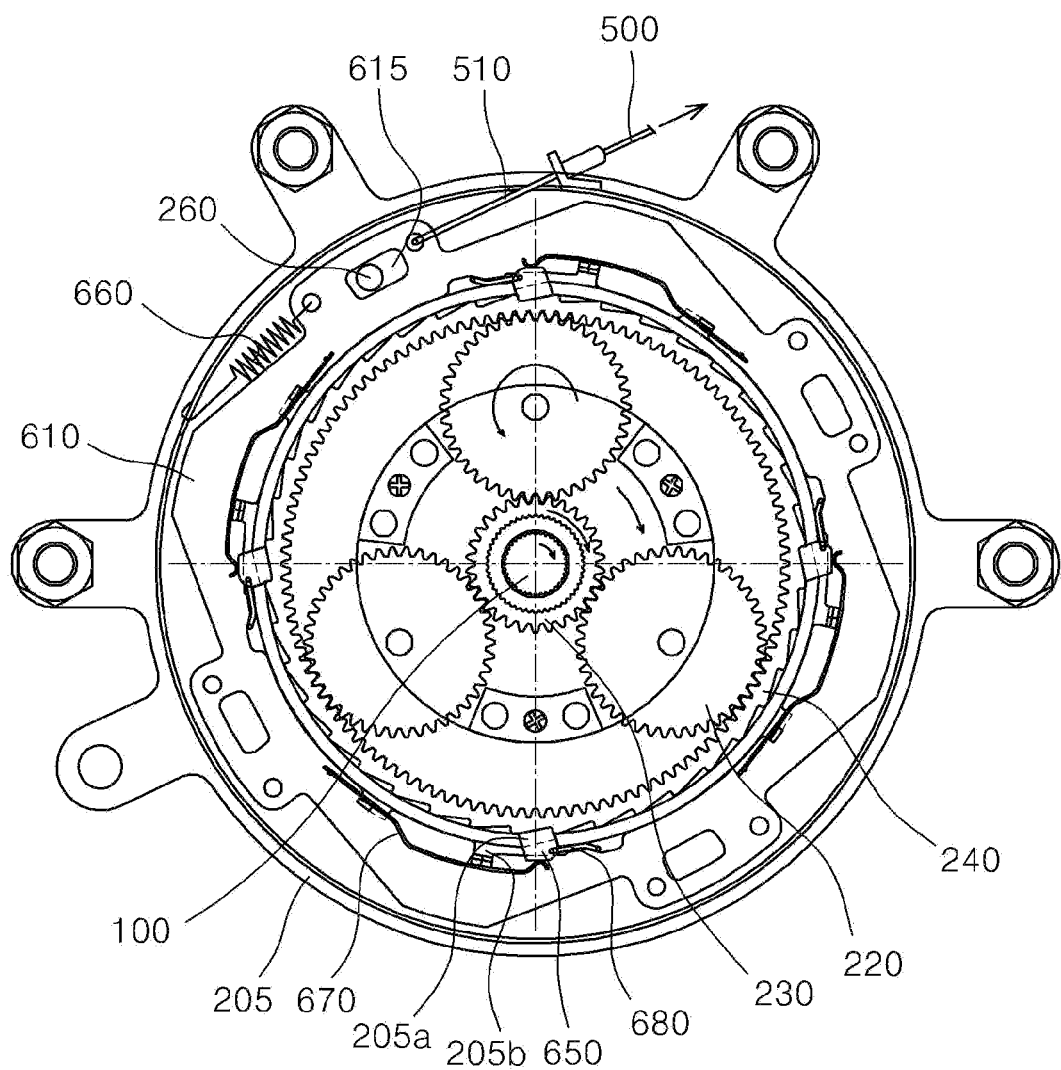
FIG. 21 is a diagram showing a state of using the interlocking unit of FIG. 20.

FIGS. 20 and 21 show an interlocking unit according to another embodiment of the present invention.

The interlocking unit includes: a clutch ring member 610 that is disposed to surround the outer circumferential surface of a case 205 and that is interlocked and rotated at the time of performing a stress operation of a cable 500; a pole member 650 that is disposed on the inner circumferential surface of the clutch ring member 610 so as to interlock with the clutch ring member 610 and that is disposed to go in and out with respect to the outer and inner sides of the case; a pressure spring 670 that is disposed on inner circumferential surface of the clutch ring member 610 so as to support an egression and ingression operation of the pole member 650 and that contacts the pole member 650, to thus support to pressurize the pole member 650 toward the ring gear; and an elevation lever 680 whose one end is connected to the pole member 650 and whose other end comes into contact with the inner circumferential surface of the clutch ring member 610 on a region by region basis, to thereby make the pole member 650 selectively go in and out with respect to the case.

The clutch ring member 610 is connected to the end of the cable 500 through a connector 510 and is also connected to the tension spring member 660, to thus have a restoring force at a return operation.

In addition, the clutch ring member 610 is formed to have a rotation angle limiting hole 615 to limit the angle of rotation, and a fixed axis 260 that is axially combined with the case is accommodated in and combined with the rotation angle limiting hole 615.

One end of the tension spring member 660 is connected with clutch ring member 610 and the other end thereof is fixed to the case.

In other words, the tension spring member 660 is extended during performing a strain operation of the cable, and is contracted when manipulation of the cable is completed, to thus make the clutch ring member 610 return to the original position.

One end of the pressure spring 670 is fixed to the case 205, one middle portion thereof is supported through a supporting projection 205b that is protruded toward the case, and the other end thereof comes into contact with the pole member 650.

Since the other end of the pressure spring 670 is formed to be bent in a rounded form, the pressure spring 670 is in contact with the pole member 650 during rotation of the clutch ring member 610, to thus press the pole member 650 toward the ring gear to enter the inside of the case 205.

In addition, the case 205 is formed to have a pole egression and ingression hole 205a on the outer circumferential surface thereof so that the pole member 650 goes in and out through the pole egression and ingression hole 205a.

The pole egression and ingression hole may be formed in a manner that a number of pole members are not accommodated in a single hole, but are accommodated in a number of pole egression and ingression holes that are formed on the outer circumferential surface of the case 205 at a distance spaced from each other, respectively, that is, in a divisional way.

In the case that a force exceeding a tensile force of the tension spring member 660 is applied at a pull operation, in the interlocking unit having the above-described configuration according to another embodiment of the present invention, the clutch ring member 610 is made to rotate, and the other end of the pressure spring 670 presses the pole member 650. Accordingly, part of the pole member 650 interferes with the outer circumferential surface of the ring gear 240 that is disposed in the case 205.

Here, since saw-tooth shaped gear teeth 240a are formed on the outer circumferential surface of the ring gear 240, the ring gear 240 stops rotation through interference with the pole member 650.

Since the transmission mode shifting operations are same as those of the above-described previous embodiments, the description thereof will be omitted.

Meanwhile, when manipulation of the cable 500 is completed, the clutch ring member 610 returns to its original position by a restoring force of the tension spring member 660. Accordingly, a contact region varies in order that the end of the pressure spring 670 does not press the pole member 650, and simultaneously the inner circumferential surface of the clutch ring member 610 that is formed in a tapered shape presses the other end of the elevation lever 680, to thereby withdraw the pole member 650 to the outside of the pole egression and ingression hole 205*a*.

As a result, the interference of the fixed ring gear 240 and the pole member 650 is released, to thus maintain the ring gear 240 to remain in an idle state.

Figure 22:
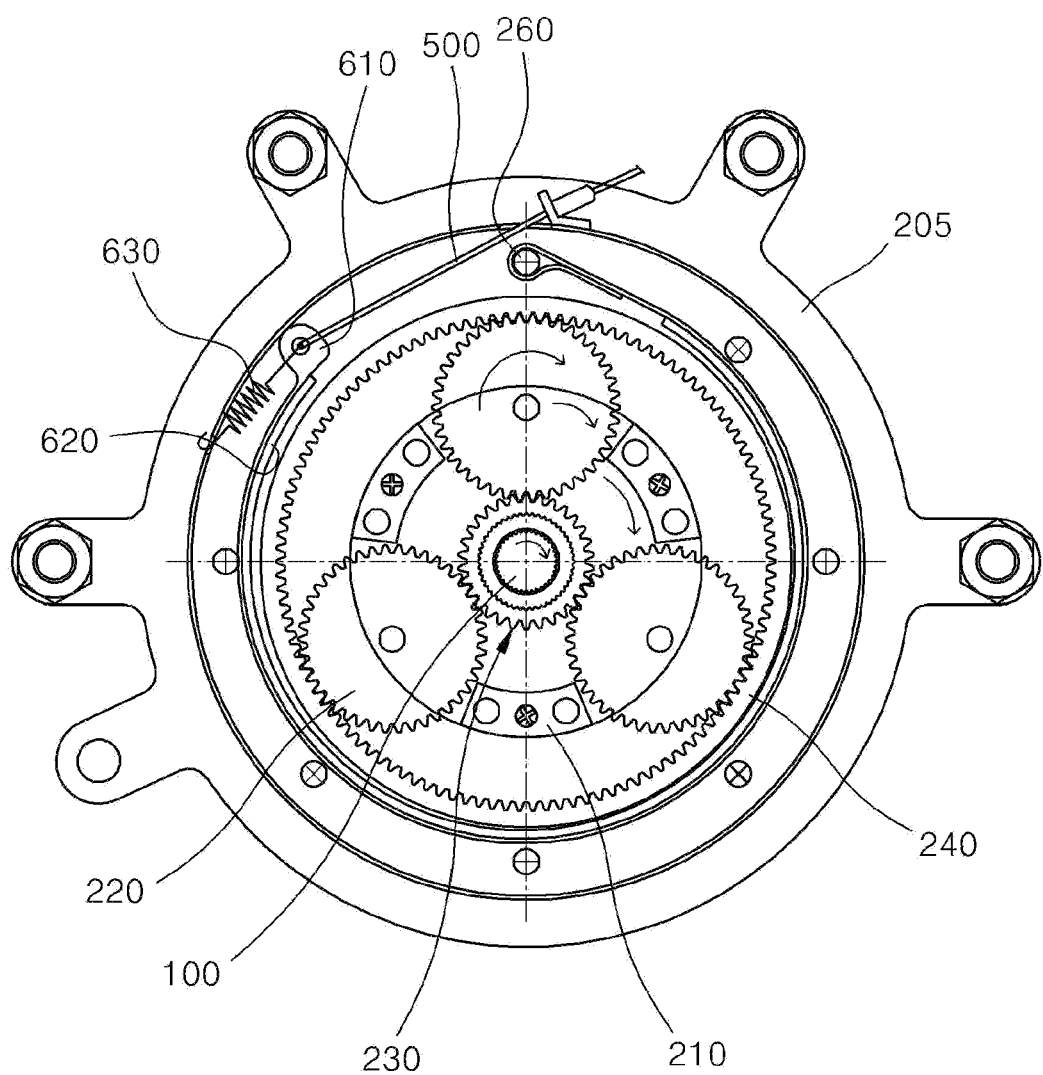
FIG. 22 is a configurational diagram illustrating still another example of a clutching unit according to the present invention.
Figure 23:
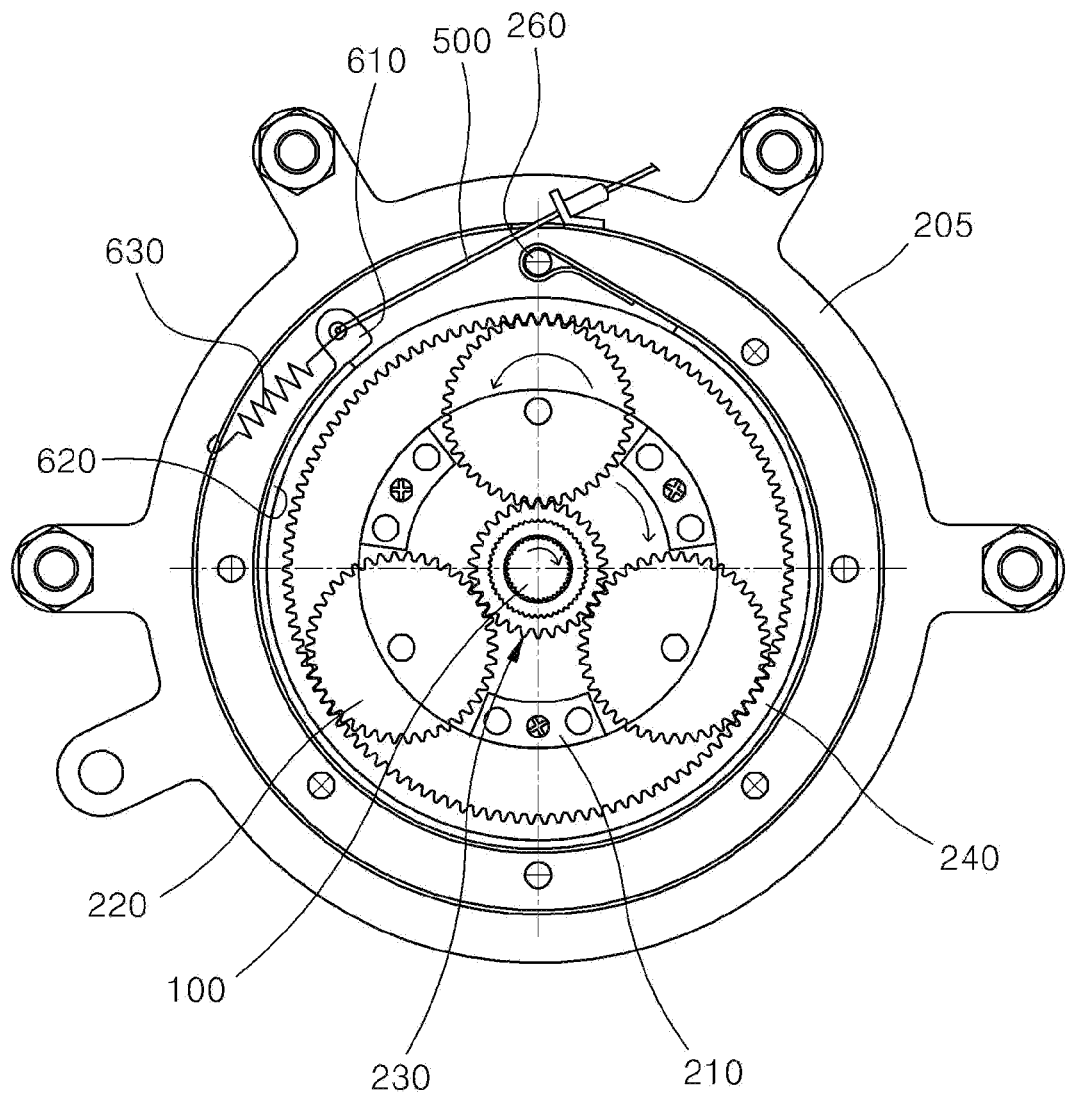
FIG. 23 is a diagram showing a state of using the clutching unit of FIG. 22.

FIG. 22 is a configurational diagram illustrating still another example of a clutching unit according to the present invention, and FIG. 23 is a diagram showing a state of using the clutching unit of FIG. 22. Referring to FIGS. 22 and 23, the clutching unit according to the present embodiment manipulates operation of the transmission mode gearshifts connected to a cable 500 selected during manipulating the cables 500 of the lever manipulation unit, to thereby selectively manipulate a transmission gear unit.

The clutching unit includes: a clutch ring member 610 whose one end is connected to a cable 500 and whose other end is fixed to a fixed axis 260 combined in a case 205, and that can move to a ring gear after being expanded by self-elasticity or being separated from the ring gear by a spring force, when a cable selected according to selection of the lever manipulation unit is pulled and stressed; and a brake pad member 620 that is disposed in the inside of the clutch ring member 610, to thus contact the outer circumferential surface of the ring gear 240, and to thereby block rotation of the ring gear 240.

In addition, "V" shaped grooves are formed on the outer circumferential surface of the ring gear 240, and "Λ" shaped projections are formed on the inner circumferential surface of the brake pad member 620, in correspondence to the "V" shaped grooves of the ring gear 240.

The clutch ring member 610 is disposed in correspondence to the outer circumferential surfaces of the ring gears 240, respectively.

One end of the clutch ring member 610 is fixed to the case 205 of the transmission gear unit, and the other end thereof is connected to a connection spring 630 having an elastic force for relaxing the cable 500.

When the cable 500 is pulled and strained, the clutching unit enables the clutch ring member 610 connected to the other end of the cable 500 to move toward the ring gear 240.

When the clutch ring member 610 moves, the brake pad member 620 provided on the inner side surface of the clutch ring member 610 is in contact with the outer circumferential surface of the ring gear selected among from the ring gears, to thus stop the ring gear by a frictional resistance.

Since a power transmission process of the transmission gear unit at a state where the ring gear is stopped is same as the above-described previous embodiments, detailed description thereof will be omitted.

Thus, the present invention determines a transmission ratio by a gear arrangement pattern or a gear tooth ratio of the transmission gear unit, and performs a transmission mode shifting operation depending on the number of transmission gearshifts.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

The invention claimed is:

1. A transmission gear box for bikes comprising:
    a main shaft that is connected to pedals and crank arms of each bike;
    a transmission gear unit having a plurality of transmission mode gearshifts provided in parallel and interlocked with the main shaft and receives a driving force transmitted from the main shaft to thus shift a transmission mode;
    a lever manipulation unit that selects one of the transmission mode gearshifts of the transmission gear unit according to manipulation of a transmission mode shift lever, to thus manipulate one of cables connected to the respective transmission mode gearshifts; and
    a clutching unit that is operated by one cable selected by the lever manipulation unit to thus make one of ring gears of the transmission gear unit fixed in a gear tooth engagement coupling manner and to thereby manipulate a transmission mode shifting process of the transmission gear unit,
    wherein the transmission gear unit comprises:
    a planet gear carrier that is spline-combined and interlocked with the main shaft;
    a plurality of planet gears that are pin-coupled and interlocked with the planet gear carrier and are disposed in parallel with each other;
    a plurality of the ring gears that are disposed in parallel with each other in correspondence to the planet gears, in which gear teeth are formed on inner circumferential surfaces of the ring gears so as to be respectively engaged with those of the planet gears; and
    sun gears and a sun gear shaft that output a transmission mode shifted driving force with respect to the driving force of the rotating main shaft to the outside when one of the ring gears is fixed by the clutching unit.

2. The transmission gear box according to claim 1, wherein the clutching unit comprises a pole member that is interlocked by an interlocking unit according to movement of a selected cable and thus interfere with one gear tooth of saw-tooth shaped gear teeth to make the ring gears stop, in which the saw-tooth shaped gear teeth are respectively formed on the outer circumferential surfaces of the ring gears that form the transmission gear unit.

3. The transmission gear box according to claim 2, wherein the interlocking unit comprises:
    a rotating shaft with which the pole member is axially rotatably combined; and
    a connection spring member that is disposed between one end of the cable and the pole member and returns the pole member to an original position after completion of the manipulation of the cable.

4. The transmission gear box according to claim 2, wherein the interlocking unit comprises:
    a rotating shaft with which a pole member is axially combined to then be rotated; and
    a clutch ring member that is disposed between an end of a cable and the pole member and is interlocked according to movement of the cable to thus control an interference operation with the ring gear by a portion contacting the pole member.

5. The transmission gear box according to claim 1, wherein the lever manipulation unit comprises:
    a housing that accommodates a transmission mode shift lever whose upper portion is protruded upward to the outside and that is movably disposed in the front and rear directions and in the left and right directions;

a plurality of manipulation levers that interfere with a portion of the transmission mode shift lever according to a front-and-rear-direction shifting operation of the transmission mode shift lever to then be rotated to stress one of the cables and are disposed in parallel with each other in the same number as that of the respective transmission mode gearshifts of the transmission gear unit;

a shift spring member that is disposed in the lower portion of the transmission mode shift lever to elastically support the transmission mode shift lever that moves backward; and a return spring member that is disposed in the lower portion of the manipulation levers to elastically support the manipulation levers that move forward.

6. The transmission gear box according to claim 5, further comprising: a power transmission unit that transfers a rotational driving force of a motor to a transmission mode gearshift of the transmission gear unit selected through the clutching unit, wherein the power transmission unit comprises:

an auxiliary sun gear shaft that is interlocked and combined with a rotor of the motor that is disposed at one side of a case surrounding the transmission gear unit, in which an auxiliary sun gear is disposed on the outer circumferential surface of the auxiliary sun gear shaft;

auxiliary planet gears that are combined with the auxiliary sun gear in a gear tooth engagement coupling manner and that are pin-combined in the inner side surface of the case;

a planet gear carrier cover that is combined with the auxiliary planet gear in a gear tooth engagement coupling manner to then be interlocked, and that is connected with a planet gear fixing pin that is axially combined with the planet gears; and a one-way clutch unit to transfer a rotational driving force of the motor and a rotational driving force of the main shaft in one direction.

7. A transmission gear box for bikes comprising:

a main shaft that is connected with pedals of each bike through crank arms;

a transmission gear unit in which a number of transmission mode gearshifts that are interlocked with the main shaft are arranged in parallel with each other, and that receives a rotational driving force transferred from the main shaft, to thus perform a transmission mode shifting operation;

a lever manipulation unit that selects one of the transmission mode gearshifts of the transmission gear unit according to manipulation of a transmission mode shift lever, to thus manipulate one of cables connected to the respective transmission mode gearshifts; and a clutching unit that manipulate a transmission mode shifting process of the transmission gear unit through one cable selected by the lever manipulation unit.

8. The transmission gear box according to claim 7, wherein the transmission gear unit comprises:

a planet gear carrier that is spline-combined and interlocked with the main shaft;

a plurality of planet gears that are pin-coupled and interlocked with the planet gear carrier and are disposed in parallel with each other to have a body formed of a small-diameter portion and a large-diameter portion in the plurality of planet gears on am identical axis;

a plurality of the ring gears that are disposed in parallel with each other in correspondence to the small-diameter portion and the large-diameter portion of each planet gear, in which gear teeth are formed on inner circumferential surfaces of the ring gears so as to be respectively engaged with those of the planet gears; and sun gears and a sun gear shaft that output a transmission mode shifted driving force with respect to the driving force of the main shaft to the outside by the planet gear engaged with one of the ring gears selected by the clutching unit.

9. The transmission gear box according to claim 7, wherein the clutching unit comprises:

a clutch ring member that can move to the ring gear when a cable selected according to selection of the lever manipulation unit is pulled and stressed; and a brake pad member that is disposed in the inside of the clutch ring member, to thus contact the outer circumferential surface of the ring gear, and to thereby block rotation of the ring gear.

\* \* \* \* \*